[19] United States Patent
Smithies et al.

[11] Patent Number: 6,091,835
[45] Date of Patent: *Jul. 18, 2000

[54] METHOD AND SYSTEM FOR TRANSCRIBING ELECTRONIC AFFIRMATIONS

[75] Inventors: Christopher P. K. Smithies, Corfe Mullen; Jeremy M. Newman, Frome, Somerset, both of United Kingdom; Benjamin Wright, Dallas, Tex.

[73] Assignee: PenOp Limited, Somerset, United Kingdom

[*] Notice: This patent is subject to a terminal disclaimer.

[21] Appl. No.: 09/024,835

[22] Filed: Feb. 17, 1998

Related U.S. Application Data

[63] Continuation-in-part of application No. 08/859,626, May 20, 1997, Pat. No. 5,818,955, which is a continuation of application No. 08/644,084, May 9, 1996, Pat. No. 5,544,255, which is a continuation of application No. 08/298,991, Aug. 31, 1994, Pat. No. 5,647,017.

[51] Int. Cl.[7] .................................................. G06K 9/00

[52] U.S. Cl. ................ 382/115; 382/232; 340/825.34; 380/23

[58] Field of Search ................................. 382/115, 116, 382/117, 118, 119, 120, 121, 122, 123, 232; 178/18.01; 340/825.3, 825.33, 825.34; 283/70, 75; 380/23

[56] References Cited

U.S. PATENT DOCUMENTS

| | | | |
|---|---|---|---|
| 3,806,704 | 4/1974 | Shinal | 235/61.7 B |
| 4,200,770 | 4/1980 | Hellman et al. | 178/22 |
| 4,202,626 | 5/1980 | Mayer, Jr. et al. | 355/52 |
| 4,323,729 | 4/1982 | Westermayer | 178/22.01 |
| 4,405,829 | 9/1983 | Rivest et al. | 178/22.1 |

FOREIGN PATENT DOCUMENTS

95/16974 6/1995 WIPO ............... G06K 9/00

OTHER PUBLICATIONS

Silanis Technology, "ERA Version 1, Electronic Revision Approval Guide to Installing and Using ERA, Version 1", pp. 1–92 (1993).

(List continued on next page.)

Primary Examiner—Andrew W. Johns
Attorney, Agent, or Firm—Kenyon & Kenyon

[57] ABSTRACT

The invention presents a method and system for recording a detailed record or "transcript" of the acts, events and forensic circumstances related to a party's affirmation of an electronic document, transaction or event. The transcript is recorded in a data object made secure through the use of encryption and a checksum. The system directs a ceremony whereby the party affirming the document, transaction or event is required to undertake a series of steps in order to successfully complete the affirmation and have the affirmation recorded; thus participation in the ceremony must take place before an affirmation will be accepted. The steps of the controlled procedure serve to gather evidence to confirm specifics such as that the affirming party: i) is in fact the identified party; ii) understands that by entering affirming data, e.g. a password, key, biometric sample or other affirming data he or she is thereby affirming or becoming legally accountable for the undertakings of the document, transaction or event triggered by computer interaction; iii) has adequately reviewed the document, transaction or statement to be affirmed (where a client application presents such a document transaction or statement to the system of the present invention); and iv) understands the undertaking of an event or the provisions within the document, transaction or statement and the consequences of affirming it. The system of the present invention is flexible and can be configured to accept all types of biometric, infometric and cryptographic signatures or affirming acts, such as those created by passwords, secret cryptographic keys, unique secret numbers, biometric recordings such as handwritten signatures or other biometric information, or multi-media recordings of affirming statements. It also permits the affirmation procedure to be tailored to the specifics of a client application through the use of an authentication policy component.

82 Claims, 17 Drawing Sheets

U.S. PATENT DOCUMENTS

| | | | |
|---|---|---|---|
| 4,495,644 | 1/1985 | Parks et al. | 382/3 |
| 4,625,076 | 11/1986 | Okamoto et al. | 178/22.11 |
| 4,656,474 | 4/1987 | Mollier et al. | 380/23 |
| 4,729,128 | 3/1988 | Grimes et al. | 382/58 |
| 4,731,575 | 3/1988 | Sloan | 324/113 |
| 4,868,877 | 9/1989 | Fischer | 380/25 |
| 4,885,777 | 12/1989 | Takaragi et al. | 380/30 |
| 5,005,200 | 4/1991 | Fischer | 380/30 |
| 5,038,392 | 8/1991 | Morris et al. | 382/61 |
| 5,054,088 | 10/1991 | Gunderson et al. | 382/3 |
| 5,091,975 | 2/1992 | Berger et al. | 382/56 |
| 5,097,504 | 3/1992 | Camion et al. | 380/23 |
| 5,109,426 | 4/1992 | Parks | 382/3 |
| 5,111,512 | 5/1992 | Fan et al. | 382/3 |
| 5,131,025 | 7/1992 | Hamasaki | 379/95 |
| 5,195,133 | 3/1993 | Kapp et al. | 380/9 |
| 5,199,068 | 3/1993 | Cox | 380/23 |
| 5,202,930 | 4/1993 | Livshitz et al. | 382/3 |
| 5,222,138 | 6/1993 | Balabon et al. | 380/23 |
| 5,226,091 | 7/1993 | Howell et al. | 382/3 |
| 5,251,265 | 10/1993 | Döhle et al. | 382/3 |
| 5,257,320 | 10/1993 | Etherington et al. | 382/3 |
| 5,278,905 | 1/1994 | McNair | 380/44 |
| 5,280,527 | 1/1994 | Gullman et al. | 380/23 |
| 5,285,506 | 2/1994 | Crooks et al. | 382/13 |
| 5,297,202 | 3/1994 | Kapp et al. | 380/9 |
| 5,311,595 | 5/1994 | Bjerrum | 380/25 |
| 5,321,749 | 6/1994 | Virga | 380/18 |
| 5,322,978 | 6/1994 | Protheroe et al. | 178/18 |
| 5,323,465 | 6/1994 | Avarne | 380/23 |
| 5,339,361 | 8/1994 | Schwalm et al. | 380/23 |
| 5,544,255 | 8/1996 | Smithies et al. | 382/119 |
| 5,647,017 | 7/1997 | Smithies et al. | 382/119 |
| 5,818,955 | 10/1998 | Smithies et al. | 382/115 |
| 5,872,848 | 2/1999 | Romney et al. | 380/25 |

OTHER PUBLICATIONS

"Written Approval" article from Computer–Aided Engineering: Computer Applications in Design, Analysis and Manufacturing, Aug. 1993.

B. Paul Cotter and John H. Messing, "Electronic Court Filing In the Pima County Small Claims Court—Technical Parameters, Adopted Solutions, and Some of the Legal Issues Involved", Jurimetrics, Spring 1998, vol. 38, No. 3, pp. 400–404.

Stan Jessen, "Digital Non–Refutable Documents", 1996.

"Pen Op—Pen to Peer Biometric Security For Pen–based Computing", 1991, *Peripheral Vision Limited*.

Dan Mezick, "Pen Computing Catches On", Oct. 1993, *Byte*, vol. 18, No. 11, p. 105.

Portia Isaacson, "Electronic Ink Emerges As A Launchpad of the Future—While Few Products Exist, Jot 1.0 Standard Is A Step", Jun. 28, 1993, *Computer Reseller News*, p. 62.

Ray Duncan, "Processing Ink In A Pen Windows Application; Power Programming Column; Tutorial", vol. II, No. 9, p. 397, May 12, 1992, *PC Magazine*.

"Document Signing At A Distance . . . Product and Service News", Jul. 1993, vol. 10, No. 7, p. 3, *Telecommuting Review: the Gordon Report*.

Mitch Betts, CW Staff, "Execs Can Sign Papers By Remote Control; Pen Computing–Based System Allows Addition of Handwritten Notes", Jun. 14, 1993, p. 57, *Computerworld*.

"Mobile World—Signing Documents Remotely By Pen Computer", Mar. 8, 1993, *Newbytes News Network*.

Peripheral Vision Ships PenOp: Software For The Handwritten Signature In Pen Computing, Sep. 1, 1993, *Business Wire*.

"Digital Ink Begins To Flow Onto Tablets . . . The Latest Word", May 11, 1992, vol. 6, No. 9, p. 21, *Seybold Report On Desktop Publishing*.

Yvonne Lee, "Third–Party Developers Lead As Pen Systems Part Ways", Apr. 20, 1992, *InfoWorld*, p. 1.

"Sign–On For Pen–Based Computing . . . Product Announcement", Nov. 1993, vol. 11, No. 11, p. 62 *Data Based Advisor*.

Mary F. Theofanos, John T. Phillips, "Digital Signatures: Signing and Notarizing Electronic Forms", Apr. 1994, vol. 28, No. 2, p. 18, *Records Management Quarterly*.

William Stallings, "Make It Real; Using Authentication In Network Security", Sep. 1993, vol. 8, No. 9, p. 105, *LAN Magazine*.

Henry Bortman, "On Beyond E–Mail, Apple's Open Collaboration Environment Operating Systems", Mar. 1992, vol. 8, No. 3, p. 191, *MacUser*.

John A. Newman, "Electronic Contracts on the Internet",vol. 7, No. 4, p. 48, *EDI Forum*, Dec. 1994.

Enliven Impulse, *http://www.narrative.com*, printed May 29, 1998.

Philip A. DesAutels, DSig Activity Statement, *http://www.w3.org/DSig/Activity.html*, dated Jan. 2, 1998.

"First Virtual Website," *http://vtag.com* and *http://www.firstvirtual.com*, printed May 29, 1998.

Declaration of Intent                                    [X]

Please verify that this is your name or ID:
| whayes@penop.com | ~520

Please verify that this is the correct time:
| 10:21am EST   10 Feb 1998 | ~522          ~518

Choose an entry from the list or type in a reason for affirming

| I hereby approve [DocName].
| I hereby authorise the transmission of [DocName].
| I am signing to confirm that [DocName] has been reviewed.      ~524
| I confirm that [DocName] has been authorised in accordance with stan|

Reason for affirming

| I hereby approve General Orientation & Training Program SOP v1.5. |
|                                                                    |  ~526
|                                                                    |

[Approve] ~530                    [Cancel] ~528

Fig. 4b

| 22 | TRANSCRIPT VIEWING FUNCTIONS | |
|---|---|---|
| 702 | claimed_id: | Displays Claimed Identity of the Signer |
| 704 | time_signed: | Displays the date/time of the affirmation process |
| 706 | verify_file: | Checks the contents of the document, transaction or statement against the stored document checksum |
| 708 | integ_chk: | Checks the contents of the transcript object against the stored integrity checksum accessible upon receipt of client application key |
| 710 | sig_typ: | Displays the types of electronic signature(s) used to verify the document, transaction or event |
| 712 | dec_i: | Displays the declaration of intent prepared by affirming party as part of transcript generator module process |
| 713 | dump_to_file: | Outputs to the named file a dump of all data contained within the transcript, suitable for forensic analysis. |

Fig. 5

METHOD AND SYSTEM FOR TRANSCRIBING ELECTRONIC AFFIRMATIONS

RELATED APPLICATIONS

This application is a continuation-in-part of U.S. patent application Ser. No. 08/859,626, filed May 20, 1997 now U.S. Pat. No. 5,818,955, which is a continuation of U.S. application Ser. No. 08/644,084, filed May 9, 1996 (now issued as U.S. Pat. No. 5,544,255) which is a continuation of U.S. application Ser. No. 08/298,991, filed Aug. 31, 1994 (now issued as U.S. Pat. No. 5,647,017).

FIELD OF INVENTION

The present invention relates generally to the field of computer systems for electronic transaction processing, and, in particular, to the field of computer-based recording or "transcribing" systems for collecting and storing data that evidences the facts and circumstances of a party's electronic affirmation of a document, transaction or event (e.g., the signing of an electronic document, the negotiation of an electronic sale, the affirmation of statements such as those recorded in a deposition, and the validation or verification of accountings, spreadsheets, applications, blueprints, goveirnent filings and other items). The present invention controls a sequence of events related to the occurrence of the affirmation, and then records and stores the facts and circumstances surrounding this controlled sequence to provide forensic evidence to show, inter alia, that an electronic affirmation did in fact take place, the affirmation took place due to the manual actions of the claimed affirming party, and the party did have an understanding and intention with respect to the document transaction, or event.

COPYRIGHT NOTICE

The disclosure herein contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

The basis of commercial and societal transactions are the agreements and other legal arrangements that individuals and entities make. When proof shows that a party agreed to, validated or otherwise affirmed a transaction, that party can be legally bound to the obligations undertaken in that transaction. When proof shows that a party sanctioned, condoned or affirmed an activity or statement that party can be held accountable for the truth of the statement or the consequences of the sanctioned act.

Businesses increasingly seek to further use the computer in eliminating paper and in reducing both the costs and the time involved in processing commercial and societal transactions. One obstacle to this goal is the need, whether legal, regulatory or otherwise, to effectively monitor and gather evidence of a party's assent to a document, transaction or event. As the advent of powerful computer systems and advanced computer networks continue the advance toward an era of electronically conducted business and legal transactions, the computer systems that enable this evolving means of commerce must be at least as convenient and reliable as the systems that people have used in the past to make agreements and arrangements. In essence, the computer systems must provide a means for storing legally credible evidence that confirms these agreements and arrangements and demonstrates the extent of a party's identity and the extent of the party's assent to them.

Throughout history, people have used a number of means to evidence an agreement, transaction or statement and memorialize a party's assent or validation. The use of a paper document, which fixes the terms of an agreement or transaction (or the statements for affirmation) to palpable pages, is a time-honored method for evidencing an agreement, transaction or statement. Commercial documents (e.g., contracts, bills of sale, credit card authorizations, invoices, notes, negotiable instruments and other commercial paper); documents of estate, title and transfer (e.g., wills, trusts, leases, assignments, easements and deeds); and documents of governmental compliance (e.g., permits, authorizations, applications, tax returns, and other filings) all constitute paper memorials of commercial transactions and arrangements. Statements used in legal proceedings, such as those in depositions, court testimony and affidavits are also set forth on paper. The printed record conveys a sense of permanence and provides a tangible record for storage and reference which is reasonably difficult to alter without detection.

To validate terms or statements, paper documents often contain the signatures of the agreeing parties. A signature on paper can take many different forms. Traditional signatures include handwritten signatures, such as, e.g., the signer's name, written in his or her own hand, the signer's initials, the signer's mark, fingerprints and other identifying body marks, typewritten initials and stamps or seals. Through custom, common usage and judicial recognition developed over many years, courts have come to recognize that a signature on paper may provide proof of both the identity of the signer and an affirming intent on behalf of the signing party.

Courts recognize that the identity of the signer may be proven by the forensic analysis of certain types of signatures on paper, such as handwritten signatures and fingerprints. Forensic analysis uses the uniqueness of a person's handwriting or other mark to verify the identity of the person who affixed the signature to the document. The analysis can either validate the signature or provide evidence that it is a forgery. Other types of signatures on paper, such as typewritten signatures, stamps or seals, can also be used as proof to establish a signer's identity when such signatures are combined with other collateral evidence.

In addition to providing proof of identity, courts also recognize (and people commonly understand) that a signature affixed to a paper document witnesses a party's affirming intentions. Such an affixed signature acts as evidence that the signing party enjoyed a full opportunity to review and understand the contents and implications of the signed document. In the case of a contract or a will, a signature provides evidence that the party affirms the document and agrees to the terms stated within. In the case of a loan application, tax return, deposition, affidavit or insurance contract, a signature certifies that the signing party believes that the statements in the document are true. In addition to such affirming uses, a signature can also act as a shield against repudiation (e.g., as in the case of a signed negotiable instrument).

Parties may combine the simple method of affixing a signature to a document with other procedures to provide additional evidence of both the identity of the signer and his or her affirming intention in signing the paper document.

Witnesses and notaries are common requirements for certain documents—the witnesses and notaries provide extra assurance as to the signer's identity. A notary will attest inter alia that the signer: (i) presented him or herself to the notary; (ii) gave proof of identity such as a driver's license or birth certificate (proving that claimed identity of the signer matches the claimed identity in the document); and (iii) executed the document in the presence of the notary. This collateral evidence supports the contention that the signer was in fact the person identified by the signature on the document.

The parties to a transaction memorialized on paper may also take additional steps to prove that they have both read and understood the terms of an agreement. It is common for parties to initial each page (and sometimes each clause) of an agreement to indicate that they have read and understood the document and its terms. Sometimes parties will by handwriting, ink stamp or the marking of check boxes add special notations, such as date, time, location or text such as "under advice of counsel." Many agreements also contain specific clauses or articles such as the following: "The parties, intending to be bound by the foregoing provisions execute this agreement by placing their signatures below." Such additional evidence, used in combination with a valid signature, buttresses the signature as evidence of the signer's intent to affirm provisions or undertakings in a document, transaction or event. The additional evidence also helps people remember the purpose and context of the document, transaction or event.

People use means other than the paper document and its attendant memorialization process to affirm a document, transaction or event. For example, wills are commonly video taped; the act of reading a will aloud and memorializing it on video tape serves to bind the testator and evidence his intent. Raising one's hand and completing an oath in open court evidences one's affirmation of the testimony to follow; this oath is both heard by those in attendance and transcribed by the court reporter.

Society is today embracing the advantages of digital computer technology. A system for evidencing and affirming transactions and statements in digital, electronic format must now address basic issues long since resolved and accepted in terms of paper and other types of documentation: (i) the system must store records of the transaction provisions securely and reliably, with a level of assurance as to the integrity of that record; (ii) the system must be able to authenticate the signature or action that affirms the document, transaction, or statement as that of the affirming party; and (iii) the system must ensure that the person who signs (or executes an affirming act with respect to) the document, transaction or event affirms the document and enjoys a fair opportunity to understand its content.

Computer system developers have devised solutions which focus mainly upon the capture of "tokens" and "electronic signatures." Where, traditionally, a person signing a paper document would typically place his or her own written signature on a paper document to make a uniquely identifying mark, a person affirming a document by computer inputs a token—a virtual, electronic signature—by biometric, infometric or cryptographic means.

Biometric signatures include such electronic signatures as fingerprints, retinal scans, voice recordings and digitized handwritten signatures. A biometric signature captures a digital recording of either a physical attribute of the signer (such as a recording of the signer's voice, fingerprint or a scan or his or her retina) or the performance of an activity of the signer (such as the making of a signature with a pen-based digitizer, or the recital of a specific phrase by the signer).

Biometric signatures can also include statistical and other mathematical analysis of the digitally recorded data. For example, a pen-based signature capture system can analyze the pen strokes, timing and motions of the signer's hand as he or she inputs a signature. Algorithms exist that can take pen-based input (such as a handwritten signature), determine the fundamental characteristics of the input (such as the shape of the signature and other dynamics such as the speed and rhythm of the input) and represent the characteristics of the input in an electronic format. Algorithms also exist that can determine if a handwritten signature in electronic format is that of the same person. See. U.S. Pat. No. 5,544,255, U.S. Pat. No. 5,647,017, U.S. Pat. No. 5,109,426 (U.K. Application No. 9024383.3), U.S. Pat. No. 4,495,644 and U.K. Application No. 1480066, all expressly incorporated by reference herein.

Infometric signatures include such electronic signatures as, passwords, PIN numbers, access codes and personal information responses. An infometric electronic signature captures some piece of information that attests to the fact that the signer was someone who demonstrated knowledge of some fact or facts which were at the material time thought to be a secret known only to the signer. A common example is the use of a PIN to authorize release of cash from an automatic teller machine.

A cryptographic signature involves the encryption or transformation of a message with a key that is kept wholly or partially secret. One method for maintaining secrecy is to store the key in a Smart Card that will allow access to the key only when the card is inserted into a Smart Card reader and a password is entered. In a symmetric key system, the key used to create the signature is the same as the key used to verify the signature. In an asymmetric key system, the two keys are different. A so-called private key is used to create the signature, and its public counterpart is used to verify the signature. The cryptographic signature created with an asymmetric key system is typically called a "digital signature." See Digital Signature Guidelines, published Aug. 1, 1996 by the Information Security Committee, Science and Technology Section of the American Bar Association (the "ABA guidelines"). The ABA Guidelines describe the conventional thing on how a digital signature is created and verified using an asymmetric key system.

All electronic signatures, whether biometric, infometric or cryptographic, create (with varying degrees of evidentiary value) a link between the signer and the transaction. The currently available systems seek to associate the input of the token or signature with a record of the provisions of an electronic document or transaction. However, the systems have done little to collect other information surrounding the affirmation process—vital information that can both authenticate the signature as that of the affirming party or prove that the affirming party understood the provisions of the document or transaction and consciously assented to them. That information could be pivotal in the event of a legal dispute, for example, over whether obligations of a transaction should be enforced against the affirming party. If it cannot be shown that the party had a good chance to examine the transaction, then a court might decline to enforce the obligation undertaken.

Many system developers recognize that biometric signature capture systems have an advantage over other signature capture systems (infometric and cryptographic) in that a biometric system can capture unique data which can be used to prove the identity of the signer. For example, pen-based technology (the most commonly used biometric signature method) has evolved to the point where a signature entered electronically at the time of signing can be tied to an electronic document with a degree of reliability that is equal to or perhaps greater than the traditional process of affixing a handwritten signature to a paper document in terms of verifying the identity of the signer. It has been hoped that such biometric systems can be applied for widespread use in large networked system.

However, biometric signature capturing systems have a disadvantage in that they require special hardware at the signer's terminal for operation. A signer can "input" a physical or biometric-based signature into the computer only via special hardware (e.g., pen-based digital input devices, retinal scanners, fingerprint imaging hardware). The use of such hardware currently is not feasible for widespread use. For the most part, signers today indicate their identity and gain access to computer systems and computer documents through infometric and cryptographic signatures such as passwords, access cards and other keys.

There is a basic evidentiary difference between biometric signatures and other electronic devices. Whereas the biometric measurements taken can be used to uniquely identify the signer, other types of electronic signatures do not provide such reliable evidence of identity. Electronic signatures, such as passwords, access cards and other keys, are not considered fully secure, as they are easily transferable amongst users. In particular, they contain no unique ties to the "signer" which a computer can analyze to guarantee that the person inputting the electronic signature is in fact the person assigned to that signature. Passwords, access cards and keys can be stolen, compromised and misused by others; systems relying on such devices have no way to detect this misuse. The nature of computers, which allows for the easy copying and alteration of data, poses a special risk for any system where the user who input an infometric or cryptographic token was not the claimed affirming party.

It is possible, however, to buttress or raise the evidentiary level of a cryptographic or infometric signature by gathering additional collateral evidence to support the contention that the token was input by the person who is claimed to be the arming party. In traditional paper document systems, substitute "signatures" such as stamps, seals and other marks have been used in conjunction with collateral evidence to bolster the contention that the signature represents the assent of a genuine authorized party. An example of such collateral evidence might be the use of paper with printing, watermarking or compositions that are unique to the signer or his circumstances.

In the same way that computer systems must make extra provisions for validating the identity of an affirming party, they must also insure that the affirming party understood and assented to the terms of an electronic document. The levels of interface which are part of any computer systems can raise questions as to whether the affirming party fully reviewed, understood and agreed to the statements within an electronic document. A paper document, by its physical nature, can be easily examined and reviewed; there is a presumption that a paper document presented to an affirming party and signed must have been reviewed by the affirming party. In contrast, the virtual nature of an electronic document, which is hidden at all times from the affirming party (unless specifically viewed from a display) denies that presumption. Again, computer systems which affirm electronic documents, transactions and statements, must take additional measures to ensure that the affirmation process generates and stores sufficient information to verify the affirming party's intent.

Although all token, biometric, infometric and cryptographic signatures, can affix some symbol (each having varying evidentiary value) to a document, transaction or event they do not of themselves provide evidence of the affirming party's knowledge or intention with regard to the provisions or undertakings of the document, transaction or event. The token, in the virtual world, does not by itself bear witness to the actual conduct of the affirming party, or the context in which the electronic signature was affixed. For example, it might be that the private key of the affirming party passes into the custody of another person, who affixes the signature without the knowledge of the rightful owner. It might be that a third party or a computer system induced the affirming party to enter his personal token without being made to understand that he or she is affirming an electronic transaction thereby. Or, it might be that a person possessing a private key used it to only confirm the integrity and origin of a message (the message might be a mere draft of a potential contract), but not to show his or her intention to approve, sign and/or be held legally accountable for the words of the message.

As noted above, the significance of handwriting a traditional signature on paper is guided by culture, context, and the physical properties of paper, ink and the human hand. People know, as a result of life experience, that by performing the act of signing on a piece of paper the signer undertakes responsibilities according to the circumstances. Those circumstances include a physical and visually verifiable relationship between the paper, the words written on it, and the signature, and that relationship is reliably. For these reasons, a signature on paper is direct evidence of the intention of a person at a particular time.

The significance of an electronic signature, however, is compromised for two reasons. First, the computational affixation of a signature to an electronic transaction does not in and of itself evidence that the affirming party was aware that the affixation was occurring and was causing it to happen or show that the affirming party intended the affixation to carry any particular significance. Without a meaningful ceremony or procedure, akin to the existing simple procedure attending the signing of a paper transaction, there is no easily communicable instruction whereby an affirming party can be forewarned that a legally binding affirmation is occurring or that it carries any given import. Second, the systems currently available do not seek to collect a recording of the affirmation process to provide evidence of what ceremony was performed, how, in what context and with respect to which transaction. For example, the ABA Guidelines hold a person legally responsible for a message encrypted with the person's private asymmetric key, regardless of whether any signing ceremony occurred or anything is known about the context of the transaction.

Thus, there is an immediate need to create a more broad-based computer system for gathering and recording information concerning the affirmation of an electronic document. To make this system viable for the world of electronic commerce the system must work reliably and with a complete range of signature types. Such as system should operate with a capacity to generate a comprehensive transcript or record of the facts and circumstances associated with a party's action as they "sign" and "affirm" an electronic document. The transcript should provide evidence that the party both had and took advantage of the opportunity to understand the document and the significance of its affirmation, and further that the document was not signed due to fraud or deceit. A system possessing the ability to construct and maintain such an advanced and detailed transcript would be able to provide substantial evidence about the party's knowledge of and assent to a document, transaction or event.

SUMMARY OF THE INVENTION

The present invention presents a method and system for recording a detailed record or "transcript" of the acts, events and circumstances related to a party's electronic affirmation of a document, transaction or event. The system directs a "ritual" or "ceremony" of affirmation—an affirming process—whereby the party affirming the document is required to undertake a series of steps in order to successfully complete the affirmation; thus participation in the ceremony must take place before an affirmation will be accepted. The exemplary embodiment stores the detailed record in a secure data object, a transcript object. This data object will not be created and stored, and thus the document transaction or event will not be affirmed, until each of the required steps is carried out.

The details recorded by the system of the present invention provide extensive evidence to confirm specifics such as that the affirming party: i) is in fact the identified party; ii) understands that by entering affirming data, e.g. a password, key, biometric sample or other affirming data he or she is thereby affirming or becoming legally accountable for the undertakings of the document, transaction or event triggered by computer interaction; iii) has adequately reviewed the document, transaction or statement to be affirmed (where a client application presents such a document transaction or statement to the system of the present invention); and iv) understands the undertaking of an event or the provisions within the document, transaction or statement and the consequences of affirming it. The evidence stored may be stronger than that in connection with the execution of an analogous paper document, even when the system is used in conjunction with electronic signatures such as access keys, passwords and other cryptographic and infometric data.

In the system of the present invention, the creation of the transcript object is not dependent upon the type of signature or affirming act completed by the affirming party. The system of the present invention is flexible and can be configured to accept all types of signatures or affirming acts such as passwords, secret cryptographic keys, unique secret numbers, biometric recordings such as handwritten signatures or other biometric information, voice or multi-media recordings of arming statements, or even simply the typing of the text of the affirming party's name. The affirming party is given flexibility in choosing the method of affirmation and details of this method. These choices are recorded, providing further evidence of the party's deliberation, knowledge and intent. The party may be presented with a list of authentication methods to choose from, and may be allowed to tailor statements of affirmation.

While the present invention is described in light of an exemplary embodiment, which allows an affirming party to affirm an electronic document using a digitized handwritten signature, or a password or access key, the invention is not limited by this embodiment. The term "affirm" as used herein includes the act of signing a document, electronic or otherwise by any biometric, infometric or cryptographic means; it also includes any other act which commits a party in any way to a document, transaction, act or event. For instance, an affirming party may affirm a document or event through non-signature means. The party may enter vocalized affirming information. The party may enter a handle, pointer or other access to a private key which can be used to encrypt representations of the document and resulting transcript; this key will serve to verify the identity of the party. In another example, a witness may create a digital video recording of testimony which is recorded in the transcript object. Under the direction of a transcript generator module (described below), the witness may be asked to affirm her testimony both before and after its creation through the use of statements recorded as digital video and audio. An "affirmation" may also extend to events, (such as the transmission of a file or document), the occurrence of which may be recorded and stored in lieu of a traditional signature.

The goals of the present invention are achieved in the exemplary embodiment by providing a system in which a transcript generator module (described below) presents certain information relating to a document, transaction or event in an organized, sequential manner, asks the affirming party queries relating to the affirmation of the document, transaction or event and the party's identification, records information relating to the presentation of the information, the queries and the information received from the party, and securely stores this information in the transcript object. To provide a tamper-resistant record, the system and method of the present invention creates a checksum of the data within the transcript object in a procedure described below. The transcript object can be then encrypted and a record of the document, transaction or event (such as a document, transaction or statement file) passed to the application handling the document, transaction or event being affirmed. The transcript object is then associated with a record of the document, transaction or event (such as a document, transaction or statement file), and provides a secure record of the affirmation. The checksum of the transcript object is created using a symmetric key provided by the application, a "client application", which invoked the transcript generator module. Alternatively, a private asymmetric key can be provided by the client application which will be used to electronically sign the transcript object In alternative embodiments, verification of the identity of the affirming party may be carried out through a key provided by the party which would be used to checksum the transcript object.

In the exemplary embodiment of the present invention, a recording function captures the exact time of each keystroke, mouse or pointer device event, or other input, as well as representations or indications of each screen or message displayed to the affirming party, and the exact time of their display. Thus, any errors or corrections that occur during the entry of the responses will necessarily be recorded. Automated or pre-programmed input of data, such as the affirming party's claimed identity or automated entry or invocation of the affirming party's identification token (e.g., to create an electronic signature), in response to affirmation questions will also be detected. Evidence is provided to show that the party was physically present, conscious, informed and acting voluntarily as the document was affirmed. Certain data, such as the information displayed to the affirming party, may be stored as coded or compressed data.

The transcript generator module accesses a function library (e.g., a DLL) in executing its affirmation process. The functions comprising the library support various aspects of the transcript generator module such as the interactive display the provisions of the documents, transaction or statement to be affirmed or the recording of an affirmation made through any of a number of methods. To enable the transcript generator module to function according to the specifications of many different types of client applications, the transcript generator module will call one or more authentication policy components ("APCs") during the affirmation process (as will be described below). APCs constitute modules that are independent of the client application but are responsible for conducting the process of affirming party signature capture, authentication and, optionally, other interaction with the affirming party as specified by a client application. APCs also have access to additional processes in the function library. APCs allow the transcript generator module to execute the basic affirmation according to specifications dictated by the client application and, in addition, extended affirmation ceremonies, such as those described in the "Additional Application" section set forth below. An APC reviews the methods of authentication available and, in light of the transaction specifics furnished by the client application, determines the method of authentication which will occur. The selected APC then builds the portion of the affirmation transcript which corresponds to the signature capture and authentication of the affirming party. Once the invocation of the transcript generator module starts the affirmation process, neither the transcript generator module functions nor the APC can be interrupted by another process on the system; this serves to protect the integrity of the transcript object being created.

As part of the exemplary embodiment presented, the transcript generator module authenticates the APC before its functions can be invoked. The APC will be digitally signed by its creator or authorizer through the use of a private asymmetric key; in addition the client application will pass the transcript generator module the public asymmetric key of the creator or authorizer of the APC. The transcript generator module will verify that the APC code exists on the system being used for the affirmation, that it bears a valid digital signature, and that the public key provided by the client application corresponds to the public key in the APCs digital signature. Only if these steps are successful will the transcript generator module continue with the affirmation process and pass control to the APC for the signature capture (and verification) process. The APC will digitally sign the portion of the affirmation transcript that it has created using the APC's own asymmetric private key; this signature will be verified by the transcript generator module before adding this additional information to the principal transcript object.

A feature of the present invention is that it enables segregation of duties among different components which control processes leading to the creation of a transcript object. The creation of a credible transcript object requires cooperation between the client application, which is created by one developer, the transcript generator module, which is likely created by another developer, one or more APCs, under the control of a separate agent, and the affirming party. This division of tasks renders forgery of a transcript object difficult, because forgery would require collusion among one or more of these parties.

In an alternative embodiment of the present invention, the transcript generator module and the APC may be located together at a remote site and may communicate with the client application through, for example, the use of a Java™ applet. The applet will be downloaded to the affirming party's system and will interface with the affirming party under the control of the transcript generator module and the APC.

The system of the present invention also provides transcript viewing functions to any application authorized to access the completed transcript object. As the present invention provides a secure, tamper-resistant system and method for processing and handling the transcript object, client applications are provided only limited and controlled access to information within the transcript object through specific command driven functions. These functions provide the client application with information such as the claimed identity of the affirming party, the date/time of the affirmation process, document and transcript object checksum verification, signature information and declaration of intention information. In addition, the present invention permits authorized applications to access signature verification modules to verify electronic signatures such as those which are based on biometric data (e.g., digitized handwritten signatures, retinal scans, voice recordings and fingerprints). For handwritten signatures, the systems described in U.S. Pat. No. 5,544,255 to Smithies et al. and U.S. Pat. No. 5,647,017 to Smithies et al. describe systems for the verification of handwritten signatures against previously stored templates. Such systems are expressly incorporated by reference herein.

BRIEF DESCRIPTION OF THE DRAWINGS

FIG. 4b depicts an exemplary window display for the confirmation of data such as name, address, and declaration of intention.

FIG. 5 depicts an exemplary set of transcript viewing modules of the present invention.

DETAILED DESCRIPTION

FIGS. 1 through 5 depict in detail an exemplary system and method for transcripting the affirmation of a document, transaction or event. The description sets out a minimum set of components for obtaining a persuasive electronic affirmation, such that the execution and recording of the affirmation may itself provide good evidential grounds for showing that the affirming party had an understanding and intention with respect to the document, transaction or event. The authentication devices used to secure the electronic signature may be many different electronic signatures or tokens, including secret cryptographic keys, passwords, unique secret numbers, access cards or biometric recordings of handwritten autographs, voice statements (including recorded oaths), fingerprints or retinal images.

The system also employs procedures to create a controlled process which the affirming party must complete in order to affirm the document, transaction or event. These procedures record the affirming party's actions and generate additional evidence which can be used to validate the affirmed document, transaction or event. Through this process, the affirming party's attention is focused on the document, transaction or event, thereby increasing the likelihood that the party enjoyed a fair opportunity to understand its contents. The system and method described results in a tamper-resistant transcript evidencing the procedure enforced and memorializing the factual context in which the execution transpired. The transcript permits a third party such as a court to learn in great detail the factual context of the affirmation process and confirm that the "ceremony" transpired properly and provides a basis to show that the evidence has remained untainted by unauthorized intervention.

SYSTEM OVERVIEW

Figure 1:
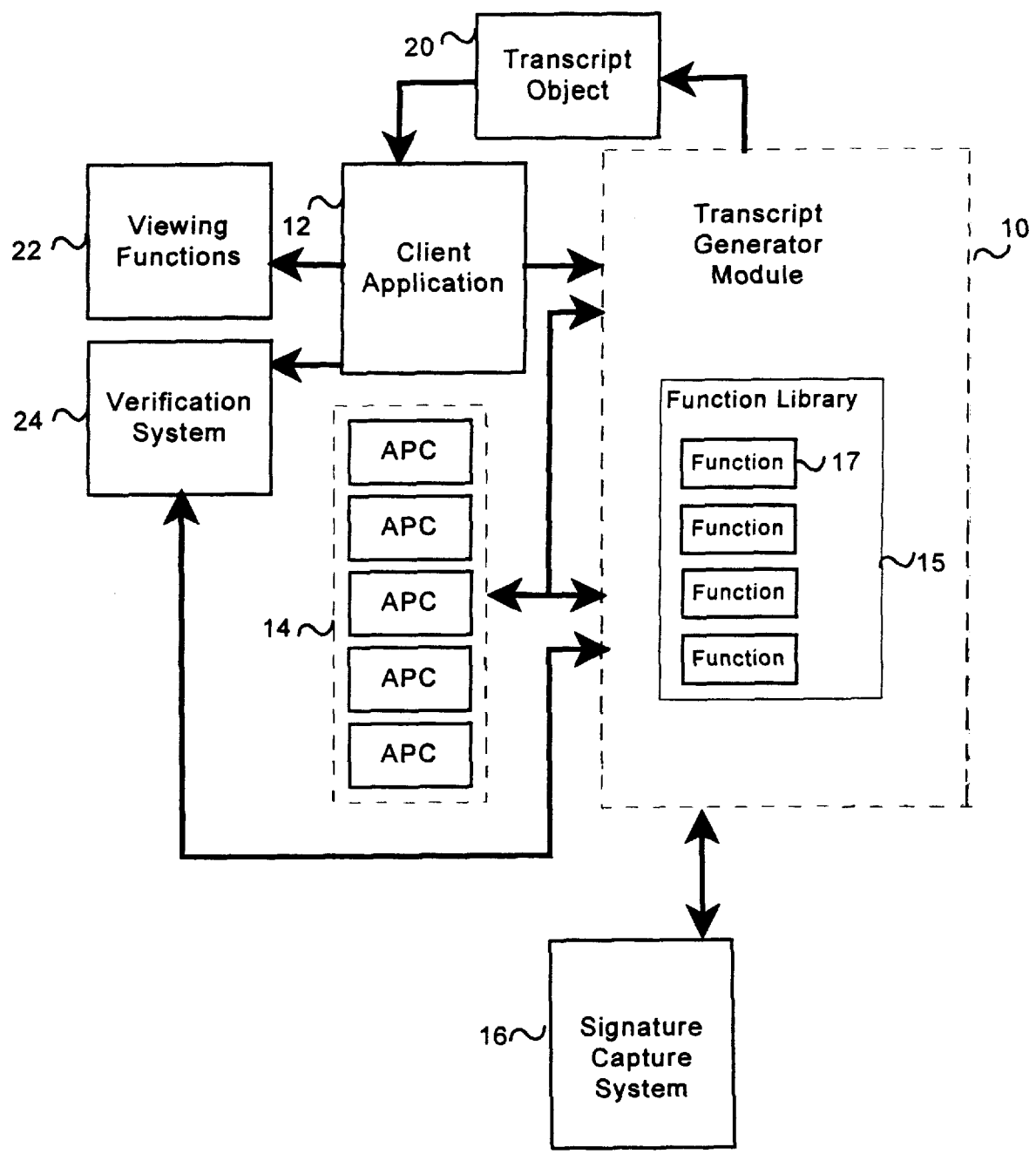
FIG. 1 depicts a block diagram illustrating an exemplary system architecture for the system and method of the present invention implemented on a single computer.
Figure 2:
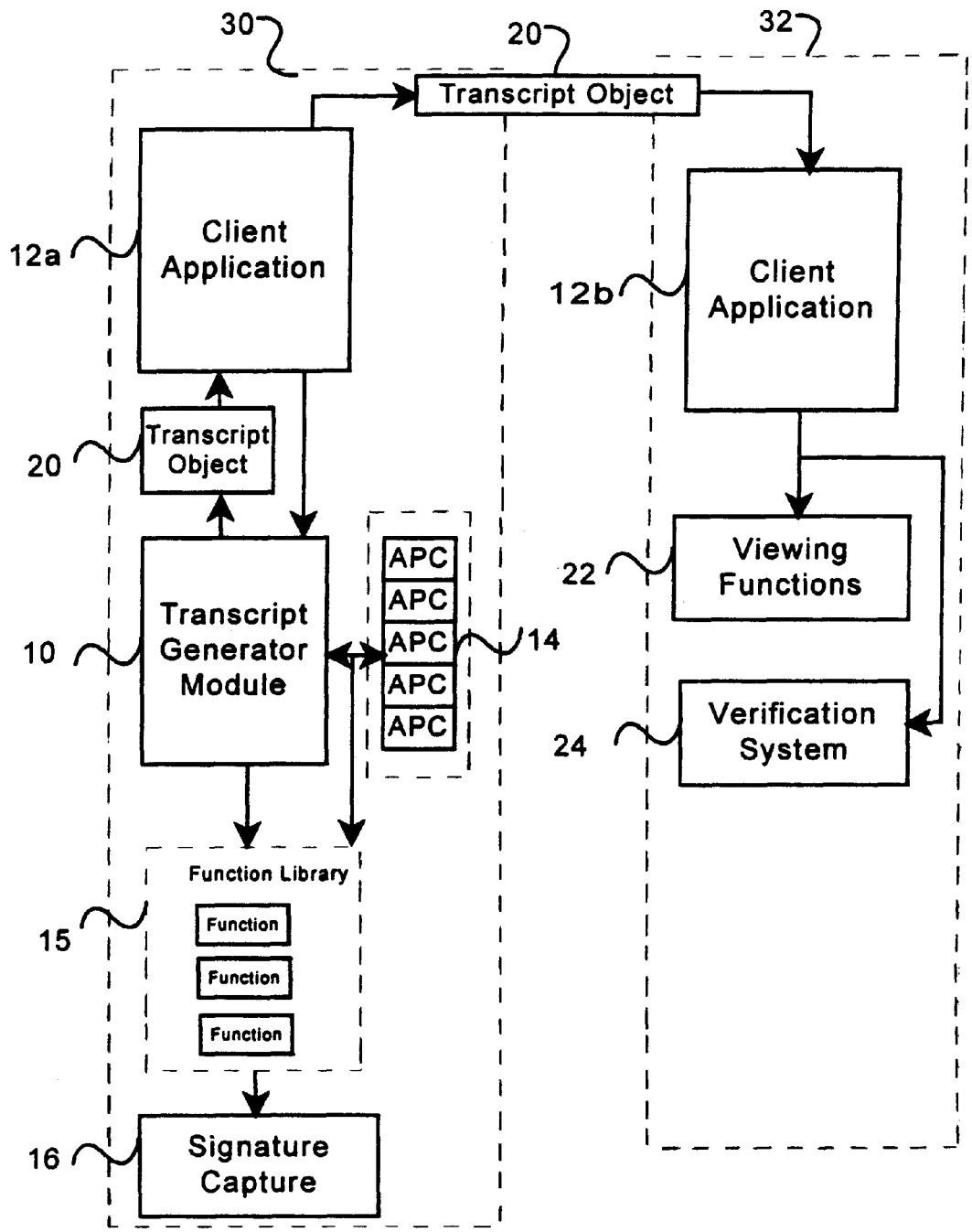
FIG. 2 depicts an exemplary system architecture showing the components of the present invention implemented in a multiple, distributed configuration having two computers.

FIGS. 1 and 2 depict block diagrams illustrating exemplary system architectures for the system and method of the present invention in both single and multiple, distributed computer systems. FIG. 1 shows a transcript generator module 10 (including a function library 15) and its connections to a client application 12, a plurality of authentication policy components (APCs) 14, and a signature capture system 16 implemented on a single computer. The transcript generator module 10, when called or invoked by the client application 12, creates a transcript object 20 using one or more of the APCs 14 and one or more of the functions within the function library 15. The APCs 14 also have access to and can invoke one or more functions within the function library 15. Data gathering functions within the function library 15 invoke a recording function 17, a function used, e.g. by an operating system event handler to write data into the transcript object 20. In addition, FIG. 1 depicts a set of transcript viewing function 22 and a signature verification system 24, which the client application 12 can access in order to perform a variety of tasks using the transcript object 20. (In certain circumstances the transcript generator module 10, in conjunction with an APC 14 and/or a function within the function library 15, will also access the signature verification system 24). The above constitute the major components of the system and method of the present invention and each is now discussed in further detail.

The transcript generator module 10 executes an affirmation process upon a call from the client application 12. The client application 12 is any application that functions to create (or retrieve from archive storage) a record of a document, transaction or statement, or executes processing to perform an event, to be signed or affirmed. Such applications include software, such as word processing programs (e.g., Word™, WordPerfect™ or Claris™) or spreadsheet programs (e.g., Excel™, Lotus™, or QuattroPro™) which have been customized to permit affirming parties to attach electronic signatures to and affirm the documents they create. The client application 12 may also be an application that enables affirming parties to execute transactions across networks such as the Internet. For example, a party purchasing a product from a seller's Web site would access such a client application 12 upon accessing the seller's Web site. The client application 12 in that example presents the affirming party with options to facilitate the sale. Further, the client application 12 includes other specialized applications, such as programs to perform or record the occurrence of an event in which the affirming party participates, such as programs to record or transcript the deposition of witnesses, programs to record corporate board meetings or contract negotiations, and programs to execute and monitor a process such as the taking of an exam.

Where the client application 12 serves to set the terms or undertakings of the document, transaction or statement, or execute an event, the transcript generator module 10 serves as the main component in generating and gathering transcript data Once called by the client application 12, the transcript generator module 10 creates a secure record of the affirming party's assent, the transcript object 20, which contains evidence to validate the signature or other affirmation as genuine and show that the affirming party had a chance to understand the terms and undertakings of the document, transaction or event. For documents, transactions, and statements, the client application 12 can call the transcript generator module 10 to affirm either a currently open document or transaction file or one previously saved. Thus, a document, transaction or statement can be created by a client application 12 in one instance and later assented to and executed by affirming party using the transcript generator module 10. In either instance, the client application 12 passes data concerning the document, transaction, statement or event to transcript generator module 10 so that it may execute and build a transcript object 20.

The transcript object 20 contains data within one or more of the following six evidence groups:

1. Evidence to Provide a Link to Affirming Party: This evidence includes information to determine and verify the identity of the affirming party, such as by biometric data, cryptographic data or infometric data.

The transcript generator module 20 is designed to ensure flexible operation of the present invention in a wide variety of computer environments and with a wide variety of client applications 12. For example, where one computer system may have computer hardware for and be configured to accept the input of digitized handwritten signatures, another computer may be configured only to accept the input of cryptographic signature such as a password or an electronic key. In addition, each client application 12 may specify requirements concerning the types of acceptable electronic signatures. For example, a specific computer system may be equipped to accept both digitized handwritten signatures and access key cards, but as to certain documents the client application 12 will only accept a digitized signature as a valid signature type.

To allow the transcript generator module 10 the flexibility it requires, the present invention provides one or more APCs 14 for use with each transcript generator module 10. As described in further detail below, the APCs 14 are program elements which review the methods of authentication available on the computer system and, in light of instructions from the client application 12, determine the types of authentication to be used during any affirmation process. The provided function library 15 permits the APC 14 to interface with the affirming party and execute the steps of signature capture.

2. Evidence to Prove the Affirming Party's Intent: In the case of documents, transactions and statements, this evidence includes information such as text (as might be contained in a declaration of intention) presented prominently to the affirming party at the time of affirmation to confirm that he or she consents to the contents of the document, transaction or statement. The system of the present invention also provides controls to ensure that the affirming party has enjoyed a fair opportunity to read and understand such contents. In the exemplary embodiment, the transcript generator module 10 is configured to either present the terms or undertakings of the document, transaction or statement to the affirming party in their entirety or make a record of the terms that the affirming party selects for review during the affirmation process. In the case of an event for which there is no written or other record at the time of affirmation, the present invention presents a declaration of intention which outlines the terms of the undertaking which the affirming party will have an opportunity to review and agree to. This record will be added to the transcript object 20. The transcript record of the transcript object 20 can be further "personalized" by prompting the affirming party to input a voluntary statement memorializing his or her intention to affirm the document, transaction or event or other information that may help the affirming party remember the circumstances of the transaction in the future. Such a statement might read, "I entered this contract with Alice, because I just had lunch with her in the corner restaurant and I trusted her."

In addition, data describing the affirming party's inputs to the system during signing or affirmation will be recorded to create an evidence trail that proves that the affirming data and other inputs were entered by the affirming party (and not, e.g., by automated entry). In the exemplary embodiment, a time stamp of each input of the affirming party, such as keystroke or mouse event information, will be recorded in the transcript. Thus, a detailed record of the affirming party's interaction with the system, including any error correction, will be recorded.

3. Evidence to Corroborate the Act of Signing or Affirmation: This evidence includes the time, location and identification data from system sources which the transcript generator module 10 collects, presents to the affirming party and requests that he or she confirm. In addition, the transcript generator module 10, in the exemplary embodiment, receives from the client application 12 the claimed identity of the affirming party and requests that the affirming party also confirm that identity. Further, the transcript generator module 10 gathers other corroborative evidence which might serve to identify the computer terminal or system with on which the affirming party is interacting. Such evidence can include operating system identity and version information, boot volume serial or identity number, network card serial number, amount of memory installed, system disk capacity, installed application program information and any other relevant system information. The affirming party's input in verifying time stamp data, discussed above, may also be used as evidence that the affirming party validly affirmed the document.

4. Evidence to Verify Integrity of the Provisions or Undertakings of a Document, Transaction or Statement: This evidence seeks to show the integrity and accuracy of the contents of the document, transaction or statement when a document or file containing them is presented to the transaction generator module 10 for affirmation. In the exemplary embodiment, the transcript generator module 10 creates a one-way hash corresponding to the contents of the document, transaction or statement. This process allows a comparison between a hash encoding of any later copy of the document, transaction or statement and the hash encoding created at the time of affirmation. This encoding, or the "document checksum," ensures that the document, transaction or statement has not been modified since the time of affirmation. Time stamp data, discussed above, may also be used as evidence that the affirming party validly assented to the document transaction or statement.

5. Evidence to Link the Specific Client Application to the Affirmation: This evidence seeks to protect the contents of the transcript object 20 and provide a basis to determine at a later date whether the transcript object 20 was tampered with after the affirmation process. In the exemplary embodiment, the transcript generator module 10 creates a checksum of the transcript object 20 using a key supplied by the client application 12. This "integrity checksum" provides two functions. First, the integrity checksum allows any application holding the key originally provided by the client application 12 to confirm the integrity of the transcript object 20 by creating a second hash code of transcript object 20 at a later date and comparing it to the first. Secondly, the key-created checksum provides (through the key utilized) a direct identifying link to a specific client application 12, which can serve as corroborative evidence that the document, transaction or event was affirmed in a specific context or with a known computing resource.

6. Evidence to Verify the Transcript Generator Module: This evidence seeks to ensure that the transcript generator module 10 was valid and not tampered with at the time of the affirmation process. The transcript generator module 10 can also checksum secretly selected components of its own code to allow someone later analyzing the transcript object 20 to confirm that the transcript generator module 10 had not been tampered with and was valid at the time of affirmation.

The transcript generator module 10 working with an invoked APC 14 and, via the operating system, the recording function 17, gathers all of the above evidentiary components and stores them in the transcript object 20. The transcript object 20 is a data structure containing a secure and permanent record that can be viewed and used to confirm (in courts, etc.) the validity of the affirmation process. At the end of the affirmation process, the transcript generator module 10 encrypts the transcript object 20 and passes it to the client application 12 for storage and later use in verifying the acts of affirmation. If the client application 12 created a document, transaction or statement containing terms or provisions that were affirmed, the client application 12 can associate or link the transcript object 20 to the relevant document, transaction or statement. Because the transcript object 20 is encrypted, the client application 12 has no ability to alter, revise or otherwise tamper with the data inside it. However, the client application 12 and related applications can read and display data within the transcript object 20 and verify certain types of signatures (e.g. handwritten and other biometric-based signatures) used in affirming the document, transaction or statement with the set of transcript viewing functions 22 and the signature verification system 24. Using the same set of components, the client application 12 and related applications can also confirm the integrity of the transcript object 20. If the client application presented a document, transaction or statement to the transcript generator module 20 for affirmation, the client application can also execute a check to determine if the terms of the document, transaction or statement have altered since the time they were affirmed.

As mentioned above, the APCs 14 constitute one or more program elements that are provided to assist the transcript generator module 10 in its collection of electronic signatures and other affirmation information. Because the system and method of the present invention may be implemented on many different computer systems, each differing widely in the type of signature capturing and verification capabilities that it may support, and as each client application 12 may institute certain requirements as to what it may permit for input as a valid signature, the APCs 14 enable the transcript generator module 10 to adapt its functions so that a transcript object 20 may be created using those signature capture tools available on the computer system in question and specified by the invoking client application 12. The transcript generator module 10 (through a function in the function library 15) passes to an APC 14 (selected by the client application 12) information describing the methods of authentication which are available on the system (e.g. authentication by digitalized handwritten signature capture is available, but authentication by access card is not available). The APC 14 also receives information (via the transcript generator module 10) from the client application 12 which specifies the client application's preferences for authentication. Based on this data (of what is available and of what is required), the selected APC 14 determines the types of authentication to be used for the affirmation process and whether any of them are optional.

In other embodiments, such as those described at the end of the specification, APCs 14 may also be programmed to execute additional affirmation procedures, such as obtaining the recording of any oath by a witness, or periodically prompting the affirming party for further authentication data, such as a password (in order to verify that a specific affirming party is personally attending to the affirmation process.)

In such a case, the APC 14 directs the course of the interaction, while the transcript generator module 10, through its function library 15, provides the means of presenting data to the affirming party and gathering time-stamped evidence of the affirming party's responses.

As a safeguard against the fraudulent substitution of APCs 14, the transcript generator module 10 is programmed to expect each APC 14 to bear the digital signature of an authorizing agent (such as the entity that created the APC 14). When invoking the transcript generator module 10, the client application 12 specifies the APC 14 to use and also provides the public key of its authorizing agent. Before invoking the specified APC 14, the transcript generator module 10 first verifies that the APC 14 exists on the system (e.g., in a shared library), the APC's 14 code has been digitally signed by the authorizing agent, and the signature matches the code. Only if these checks succeed will the transcript generator module 10 program proceed to invoke that APC 14.

In the exemplary embodiment, each APC 14 is responsible for the conduct of the affirming party's authentication, including any verification prescribed. The APC 14 builds that portion of the transcript object 20 relating to the authentication of the affirming party's signature or other authentication. In the exemplary embodiment, the APC 14 is programmed to make use of interactive routines (submodules and functions) from the function library 15, such as a routine to input a password or block of text via the keyboard, or to display a prompt. If authentication is satisfactorily completed, the APC 14 will "sign" its portion of the transcript using a cryptographic digital signature, and this will be verified by the transcript generator module 10 upon completion of the authentication phase. If the check is successful, the transcript generator module 10 adds the authentication transcript together with the public key of the authorizing agent which signed the authentication policy to the transcript object 20.

Through the function library 15, the APCs 14 can also work in conjunction with other signature capture systems 16 and signature verification systems 24 which are independent of the transcript generator module 10. Within the prior art, there are many signature capture systems 16 that do not possess the extensive capabilities of the present invention, but which could be augmented easily by an advanced transcription system such as the present invention. Existing systems, including bank account accessing systems, governmental filing systems (such as the EDGAR system), Internet commercial transaction systems, securities transaction processing systems and computerized telephone vending systems, can all be enhanced by incorporating the components of the present invention. In particular, the present invention can be used in conjunction with the signature capture and verification systems previously described in U.S. Pat. No. 5,544,255 to Smithies et al. and U.S. Pat. No. 5,647,017 to Smithies et al. The signature capture and verification systems described in those patents are expressly incorporated by reference herein for purposes of describing a signature capture system 16 and signature verification system 24.

It is a feature of the present invention that responsibility for recording the interaction of the affirming party with the system is to some degree shared between the transcript generator module 10 and the APC 14. For example, if an authentication policy requires a password to be input, the APC 14 may request that the functions of password capture be executed by one the functions in the function library 15 under the control of the transcript generator module 10, which will not only return the password information to the APC 14, but will also independently log the affirming party's interaction with the system in entering the password (e.g. a time stamp of each input, including error information) in the transcript object 20. Note also that the transcript generator module 10 allows data to be passed from the client application 12 to the APC 14 (without the transcript generator module 10 knowing the contents of that data). In the exemplary embodiment, the transcript generator module 10 is configured to pass to an APC 14 a memory block pointer or handle which was in turn passed to it by the client application 12. That memory block might contain a specific display or authentication application steps which only the APC 14 can read.

The function library 15, as mentioned above, provides a set of specific routines which the APCs 14 and the transcript generator module 10 access to perform tasks in presenting window displays and other prompts to the affirming party, monitoring and recording the affirming party's input of data, and capturing various forms of electronic signatures. This permits, for example, the APC 14 to check the credentials (pass keys) of the client application 12. The function library 15, in the exemplary embodiment, includes such functions such as:

Function: Capture Hashed Password: Computes hash of password, e.g. a MD5 hash.
Parameters in: Window title (string), prompt (string), maximum password length (integer), pointer to hash buffer.
Returns: Status (0 for OK, 1 for Cancel). Writes hash to a designated buffer.
Behavior: Displays window with appropriate title and prompt. Activates recording function 17 which stores all keystrokes and mouse events in the transcript. On successful completion, places the hash of the password entered in the hash buffer. Instructs operating system to use recording function 17 to gather input.

Function: Capture Hashed Password below Declaration of Intention: Computes hash of password, e.g a MD5 hash.
Parameters in: Window title (string), Declaration text (string), prompt (string), maximum password length (integer), pointer to hash buffer
Returns: Status (0 for OK, 1 for Cancel). Writes hash to a designated buffer.
Behavior: As above, but displaying the declaration of intention above the password field and its prompt. Instructs operating system to use recording function 17 to gather input.

Function: Capture Password: Captures password.
Parameters in: Window title (string), prompt (string), maximum password length (integer), password buffer (string)
Returns: Status (0 for OK, 1 for Cancel). Writes password to a designated buffer.
Behavior: Displays window with appropriate title and prompt. Activates recording function 17 which stores all keystrokes and mouse events in the transcript. On successful completion, places the password in a password buffer. Instructs operating system to use recording function 17 to gather input.

Function: Capture Password below Declaration of Intention: Captures password in window which presents declaration of intention.
Parameters in: Window title (string), Declaration text (string), prompt (string), maximum password length (integer), password buffer (string).
Returns: Status (0 for OK, 1 for Cancel). Writes password to a designated buffer. Instructs operating system to use recording function 17 to gather input.
Behavior: As above, but displaying the declaration of intention above the password field and its prompt. Instructs operating system to use recording function 17 to gather input.

Function: Capture Text String: Captures a user input string of text.
Parameters in: Window title (string), Prompt (string), Input field caption (string), maximum string length (integer), String buffer (string), Number of command buttons (integer), Array of button texts (strings).
Returns: Index of command button, or −1 if aborted. Writes string to designated buffer. Instructs operating system to use recording function 17 to gather input.
Behavior: Displays window with appropriate title and prompt. Activates recording function 17 which stores all keystrokes and mouse events in the transcript. On successful completion, places the string in the string buffer.

Function: Capture Text String below Declaration of Intention: Captures a user input string of text when showing the declaration of intention.
Parameters in: Window title (string), Prompt (string), Input field caption (string), Maximum string length (integer), string buffer (string), Number of command buttons (integer), Array of button texts (strings).
Returns: Index of command button, or −1 if aborted. Writes string to designated buffer.
Behavior: As above, but displaying the declaration of intention above the password field and its prompt. Instructs operating system to use the recording function 17 to gather input.

Function: Capture Bulk Text: Captures bulk text block.
Parameters in: Window title (string), Window caption (string), Text buffer size (integer), Text buffer (string), Number of command buttons (integer), Array of button texts (strings).
Returns: Index of command button, or −1 if aborted. Writes text to designated buffer.
Behavior: Displays window with appropriate title and prompt above a multi-line edit control. Activates recording function 17 which stores all mouse events in the transcript, and counts key strokes and deletions (operation of backspace and delete keys). On completion, stores keys per minute and deletion count in the transcript. On successful completion, places the string in the string buffer. Instructs operating system to use recording function 17 to gather input.

Function: Capture Bulk Text with Declaration of Intention: Captures a user input bulk text block when showing the declaration of intention.
Parameters in: Window title (string), Window caption (string), Declaration text (string), Text buffer size (integer), Text buffer (string), Number of command buttons (integer), Array of button texts (strings).
Returns: Index of command button, or −1 if aborted. Writes text to designated buffer.
Behavior: As above, but displays the declaration of intention above the multi-line edit window. Instructs operating system to use recording function 17 to gather input.

Function: Multiple Choice Alert: Provides user a window for choices and collects selection.
Parameters in: Window title (string), Prompt (string), Number of choices (integer), Array of choices (strings).
Result: Index of chosen item (0 . . . n−1, or −1 for cancel).
Behavior: Displays window with appropriate title and prompt. Displays an array of buttons labeled according to the text values given. Returns the index of the button activated. Adds mouse and keyboard events to transcript. Instructs operating system to use recording function 17 to gather input.

Function: Signature Alert with Declaration of Intention:
Parameters in: Window title (string), Declaration text (string), Prompt (string).
Result: Index of chosen item (0=OK, 1=cancel).
Behavior: A special case of the above. Displays the declaration text above the array of 2 buttons, which are labeled with the text "Sign" and "Don't Sign". Instructs operating system to use recording function 17 to gather input.

Function: Create Empty Signature Object. Returns: empty signature object in APC's allocated data space
Function: Capture Handwritten Signature:
Parameters in: Claimed ID (string), Name of file or memory reference to data to be signed (optional), Integrity key or handle to private key for integrity signature prompt (string).
Returns: Signature object and status (0 for OK, 1 for Cancel).
Result: Signature object filled-in if status is OK.
Behavior: No event monitor. Input-grabbing suspended. Calls signature capture routine. The prompt will typically be the declaration of intention. Instructs operating system to use recording function 17 to gather input.

Function: Verify Handwritten Signature:
Parameters in: Claimed ID, Signature Object.
Returns: Similarity score 0–100 or –1 for error.
Function: Add Signature to Transcript:
Parameter in: signature object.
Returns: status (0=OK, 1=error)
Behavior: Used by the APC to append a signature object generated by an external signature capture module 16 to the transcript object 20.
Signature object datum must be followed contiguously by the APC's digital signature.

Function: Recording Function
Parameters in: (Defined by operating system)
Returns: (Defined by operating system)
Behavior: Works with the other functions in the library. When a flnction to display a window is called, this function will collect key stroke and other data. This function is called by the operating system as part of the event dispatch mechanism. The transcript generator module 10 registers this function to handle input data events such as key strokes, mouse events and logical user interface (UI) control events. Significant events are logged by this function to the transcript object 20
Remarks: This function called only by the event dispatch mechanism of the operating system. It is not available to APCs 14.

The function library 15 permits flexibility in implementation and permits processes to be executed by an APC 14 (as selected by the client application 12) and by the transcript generator module 10.

In addition to the modules described above, the present invention also can implement the set of transcript viewing functions 22 and a signature verification system 24 which are used after the transcript generator module 10 completes the affirmation process. The various functions of the viewing functions 22 and a signature verification system 24 are described below.

Although FIG. 1 describes a system which is implemented on a single computer, such as one of the PC computers described below, the system and method of the present invention can also be implemented on a variety of platforms which support distributed processing. FIG. 2, for example, depicts an exemplary system architecture for the components of the present invention, implemented in a multiple, distributed configuration having two computers, a first computer 30 and a second computer 32. The first computer 30 provides a platform for a client application 12a, the transcript generator module 10, related APCs 14, the function library 15 and the signature capture system 16. The second computer 32 provides a platform for a client application 12b, the transcript viewing functions 22 and the signature verification system 24. In such a configuration, client application 12a calls the transcript generator module 10 to generate the transcript object 20. The transcript generator module 10 may use an APC 14, functions within the function library 15 and the signature capture system 16 to gather affirmation data and an electronic signatures. The transcript generator module 10 creates the transcript object 20 and passes it to the client application 12a. Client applications 12a and 12b share the transcript object 20. A user of client application 12b can access the transcript object 20, read the transaction data and verify the electronic signature and other information within it using the transcript viewing functions 22 and the signature verification system 24.

For purposes of an exemplary embodiment, the present invention can be implemented on many different computer systems and platforms with minimum hardware requirements. Most conventional PCs or Macintosh™ systems using Windowsm™, DOS™ or Mac OS™ operating systems would be suitable to serve as computer platforms for the components described herein. One exemplary configuration would be a PC with an Intel Pentium™ CPU running at 133 MHZ, with 32 Megabytes of RAM and 2 Gigabytes of disk space, and supporting an operating system such as Windows™NT or Windows™ 97. In the exemplary embodiment, each computer also includes a graphical display device and input devices such as a keyboard and mouse, all of which are supported by the operating system. For those configurations which support the input of electronic signatures, such as digitized handwritten signatures, retinal scans, voice recordings or fingerprinting, special hardware and software interfaces are required. For example, where digitized handwritten signatures are supported, the system can be implemented on pen-based computers (such as Compaq's Concerto™ computer, or IBM's P-Series Thinkpad™ computer, or on ordinary computers equipped with a desktop digitizing pad,) which support Windows for Pen Computing™, the WinTab™ pen driver, or Pen for OS/2. The software components described above can be implemented using the C++computing language and be supported on the computers with a C++compiler or cross-compiler. All references to the operation and functional steps of the software modules described in this application include by extension a reference to the computer processor (CPU) which executes the steps described. It is also noted that while the components of the present invention are presented as implemented in software, the components and processes can also be designed to implement their functions on chips by direct circuitry.

Figure 3:
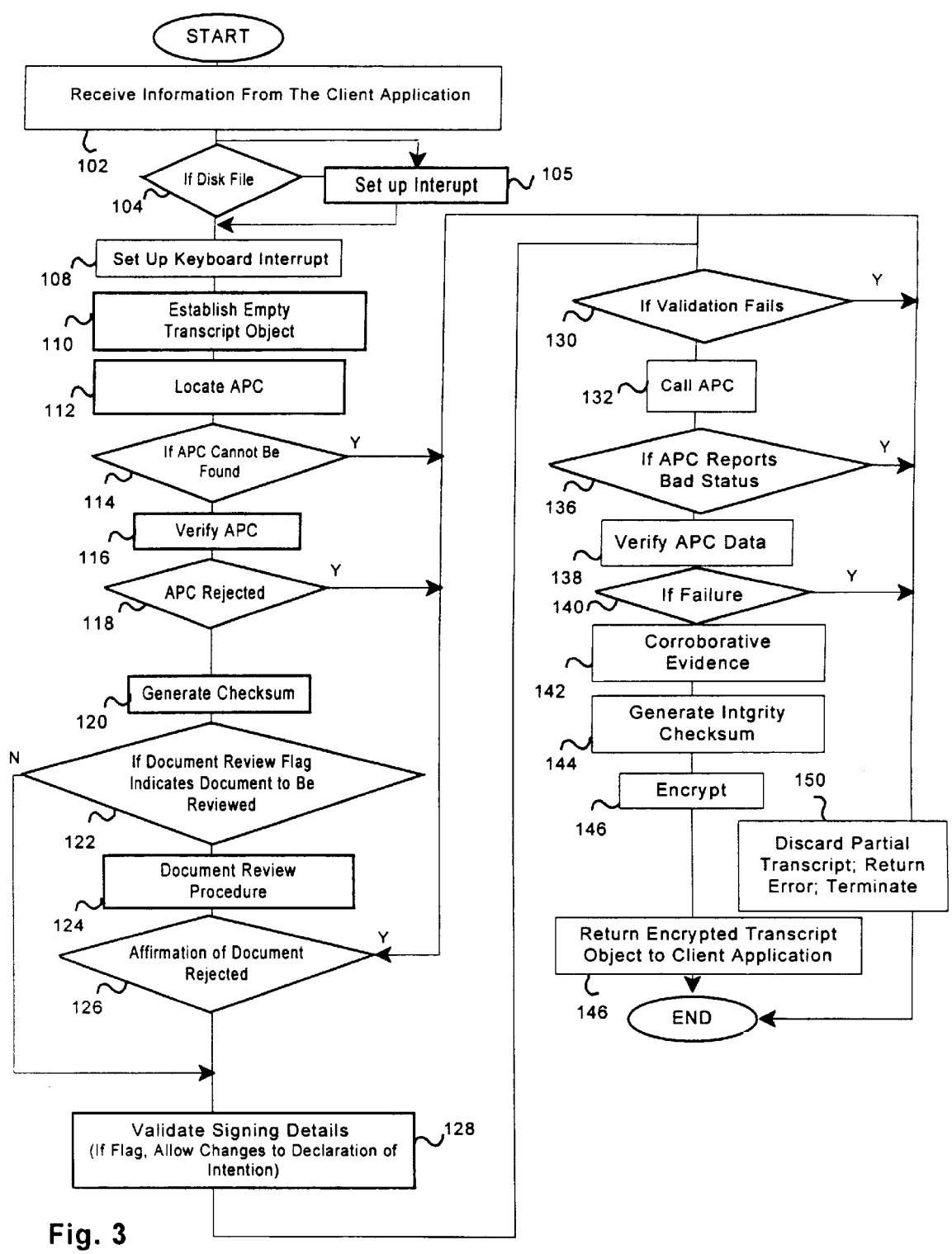
FIG. 3 depicts an exemplary process flow for the transcript generator module of the present invention.

Transcript Generator Module, Recording Function and the Authentication Policy Components FIG. 3 depicts an exemplary process flow for the transcript generator module 10. That figure may be viewed in conjunction with FIGS. 3a–f, which provide further detail for various specific steps. As the transcript generator module 10 (or as described below, a related APC 14) proceeds, it invokes functions from the function library 15 to output window displays to the affirming party. FIGS. 4a–4g depict exemplary window displays for the transcript generator module 10 and APC 14 processes.

Referring to FIG. 3, the client application 12 invokes the transcript generator module 10 with a single command (e.g., a function call). The transcript generator module 10 returns control to the client application 12 upon the completion of the controlled affirmation process. According to the exemplary embodiment, the transcript generator module 10 receives in step 102 the following data from the client application 12:

1. The claimed identity of the affirming party (such as the affirming party's name or system identification);
2. The text or contents of the document, transaction or statement to be signed or otherwise affirmed—either by a transmission of content or a reference to a memory store, e.g. a file name, or a pointer or handle reference to a RAiM memory block. (The document, transaction or statement to be affirmed can be in standard viewable or other form with the client application 12 specifying the format. The embodiment described herein supports plain text and bitmap formats. During the document review process described below (see, step 124), the provisions or portions of the document, transaction or statement are displayed to the affirming party and the affirming party's interaction in relation to that review is monitored to provide evidence that the affirming party viewed the entire document or transaction.). In the case of an event, a file or the contents of the undertaking of the event will not be supplied. In such a case, the declaration of intention expresses the user's affirmation that he or she fully understands the event taking place on completion of the ceremony;

3. The declaration of intention, which is text, audio, or images explaining the intent of the affirming party with respect to the document, transaction or event to be affirmed. (If the affirming party will have an option to choose or edit the declaration of intention then the client application can pass one or more declarations of intention);

4. A flag to indicate if the affirming party is to be given a choice of declarations of intention (in which case multiple declarations of intention will be passed or the affirming party will be allowed to edit the declaration of intention);

5. A flag to indicate if the affirming party is to first review a document before executing it;

6. An identification of the client application 12 (Such as a string of text);

7. An integrity checksum key (either a private key or secret symmetric key to guarantee the integrity of the transcript object 20 as described below);

8. The file name or other reference to the APC 14 selected by the client application 12 and the public key of its authorizing agent (the use of which is described below); and 9. Information from the client application 12 which the selected APC 14 uses to tailor the application of the affirming party's authentication as described below.

Upon completion of its function, the transcript generator module IO returns the following information to the client application 12:

1. The transcript object 20 (upon a successful affirmation); or

2. Error information (including affirming party identifications which are not recognized and information from a failed identity authentication) and/or information showing that: i) the APC 14 was not found; ii) the APC 14 was invalid; or iii) the APC 14 was canceled.

As stated above, the data passed to the transcript generator module 10 in step 102 can include either the text or contents of (or a reference to) the document, transaction or statement to be affirmed. (Event affirmation would not contain this data) That text could be from a document (e.g., a contract, tax return, deposition or affidavit) which has been prepared, for example, by the affirming party accountant or attorney. In addition, the text could also originate from a "transaction file," which a client application 12 (such as an Internet or electronic commerce program) may have prepared in connection with a possible sale of a product or service. On some occasions such as when the transcript generator module 10 transcribes the affirmation of an event, (such as at the beginning of a deposition) no text will be passed and certain steps such as step 120 (calculation of a document checksum) will be omitted from the procedure.

The declaration of intention (mentioned above) is an identification of the document, transaction or event being affirmed and/or a statement explaining significance of signing or affirming the document, transaction or event. This component allows the affirming party to confirm that the document, transaction or event being signed or otherwise affirmed is the one the party believes he or she is signing or affirming, and, moreover, alerts the party to the reason for the act of signing or affirmation. For example, an affirming party executing a consumer credit application may be presented with a declaration of intention which states: "BY SIGNING THIS DOCUMENT ON PAGE 5 YOU WILL AGREE TO THE TERMS OF THE CREDIT AGREEMENT WHICH ACCOMPANY THIS APPLICATION."

The declaration of intention is initially passed by the client application 12. However, that declaration could be substituted by a declaration of intention prepared by the affirming party during the affirmation process. See, FIG. 3, step 128. The client application 12 may allow the affirming party an option to edit or choose an alternative declaration of intention by setting a flag and passing it to the transaction generation module 10. The client application 12 may also pass additional declarations of intention for the affirming party's selection.

An additional element of data which the client application 12 passes to the transcript generator module 10 is an "integrity checksum" key (as mentioned above). The integrity checksumming process 144 provides protection to ensure that the transcript object 20 will not be altered after it has been created.

Referring again to FIG. 3, the transcript generator module 10 proceeds to step 104 after receiving data in step 102. If it is necessary in step 104 (such as in the case where the client application has passed a location to a saved document, transaction statement file), the transcript generator module 10 in step 105 places a lock on the file referenced by the client application 12 to deter changes to the document, transaction or statement provisions or undertakings contained therein.

Figure 3A:
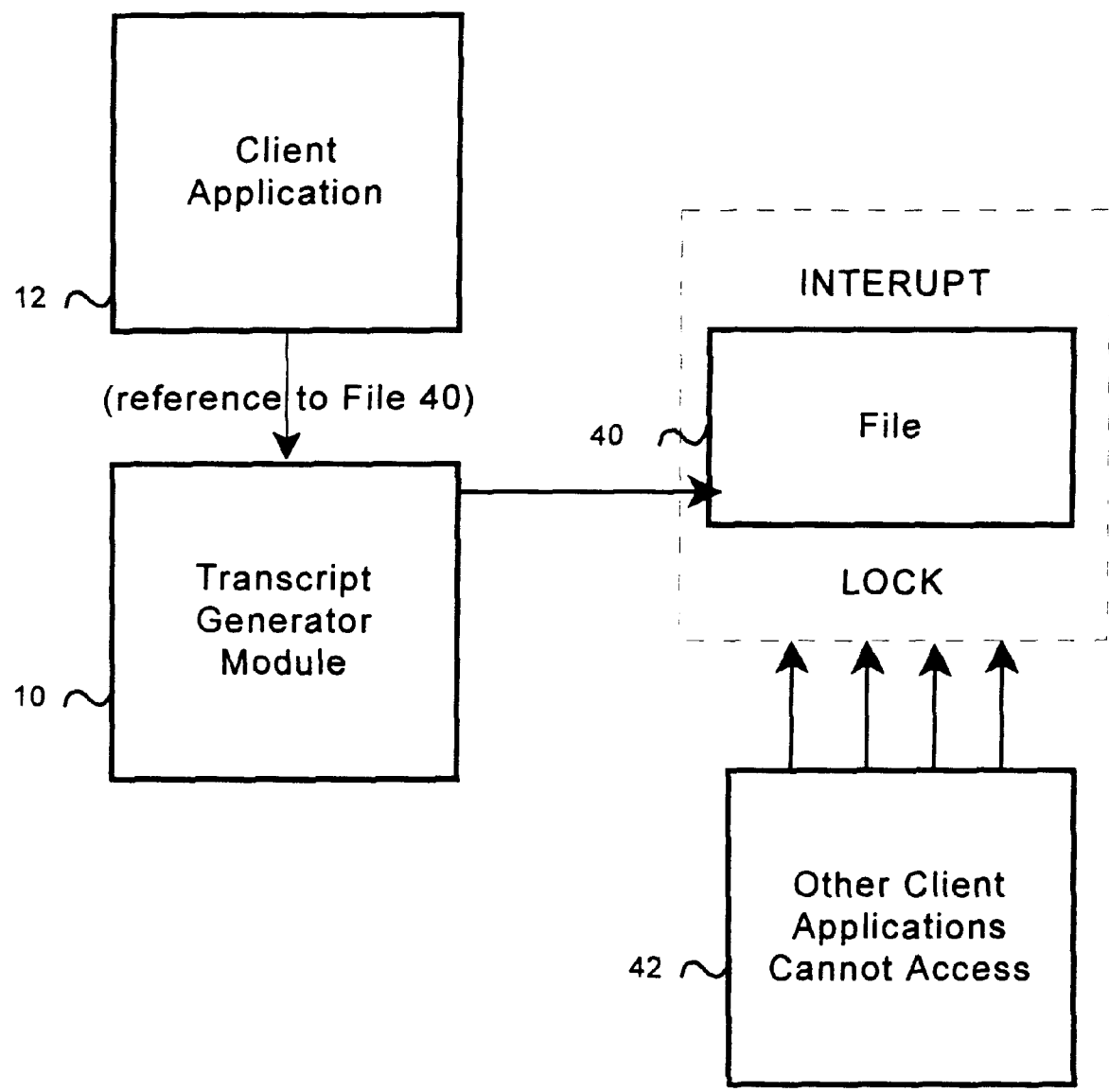
FIG. 3a depicts an implementation in which a client application has transmitted a file reference the transcript generator module and the transcript generator module executes an interrupt to lock out other access to the file.

FIG. 3a depicts an implementation in which the client application 12 has transmitted a reference to file 40 to the transcript generator module 10. Following step 104 described above, the transcript generator module 10 has subsequently placed a lock on file 40 and thus all client applications, including client applications 42, cannot access file 40 while the transcript generator module 10 operates.

By setting the low level-input filtering function in step 105, the transcript generator module 10 cannot be superseded by another program on the computing system unless and until the affirming party manually completes the transcript generator module 10's mandatory routines or cancels the transcript generator module 10 with its own cancellation features. This step deters abuse of the transcript generator module 10 and the unintended signing or affirming of document (or the affirmation of an unintended document, transaction or event).

In the exemplary embodiment (using e.g. the Windows™ operating system), the transcript generator module 10 creates a transparent window covering the entire display area to capture all mouse or pointer device interaction. All input events on this surface will be trapped and ignored. In step 108, the transcript generator module 10 also starts a subtask, a timed subprocess loop, to ensure that its user interface components cannot be overlaid by those of another concurrent process.

The subtask takes as its parameters the identifier of the transparent window and the address of a memory byte that is shared between the transcript generator module 10 and the subtask. The transcript generator submodule 10 sets the shared memory byte to 1 when invoking the subtask. The subtask executes a continuous loop such as the following:

So long as the shared memory byte is not zero:

1. Suspend the task for two seconds (using a system delay function which permits only other ready tasks to run (i.e., the function and components of the transcript generator module 10).

2. Set the transparent window to be the topmost window on the system loop. If the shared data is zero, the subtasks will increment the shared data byte and terminate.

After setting the subtask in step 108, the transaction generator module 10 in step 110 establishes a location in memory for the transcript object 20. The location of transcript object will be known as global data to the functions within the transcript generator module 10.

After step 110, the transcript generator module 10 proceeds in step 112 to locate and validate the APC 14 that has been selected by the client application 12. As stated above, the transcript generator module 10 calls an APC 14 to tailor the affirmation process to the specifics required by the client application 12. However, before the transcript generator module 10 uses the client application-specified APC 14, the transcript generator module 10 first verifies the APC 14 to ensure that its code has not been altered or otherwise tampered with.

To perform this authentication procedure, the transcript generator module 10 first locates the APC 14 specified by the client application 12 in step 112. If in step 114 the APC 14 cannot be located, the transcript generator module 10 will proceed to step 150 and terminate the operation, returning an error and the partially completed transcript object 20. If the transcript generator module 10 locates the APC 14, it proceeds in step 116 to execute a security check. To protect against tampering, the APC 14 contains a digital signature of the authorizing agent, the digital signature being created with a private asymmetric cryptographic key possessed by the agent. That cryptographic key within the APC 14 can be checked using the public key which was provided by the client application 12. In step 116, the transcript generator module 10 makes this check (using the provided public key) to determine that the digital signature contained in the APC 14 matches the code of the APC module. If in step 118 the check is unsuccessful, the transcript generator module 10 proceeds to step 150 to return an error and the contents of the partially completed transcript object 20. If the check is successful the transcript generator proceeds with further processing.

One example of the checking procedure provided by the present invention for the APC 14 is as follows: X Corporation (the authorizing agent) may require that a certain type of document be signed or otherwise affirmed by having the affirming party input his network password. To create an APC 14 that would enforce this requirement, the information technology department of X Corporation would create an APC 14 file and compile it into a binary executable file, such as one called AUTH.DDL. Having verified its correct operation, and as a part of the implementation procedure, the information technology department of X Corporation would affix its digital signature to AUTH.DDL. The client application 12 would, specify when invoking the transcript generator module 10, the use of AUTH.DDL and also provide the public asymmetric key of X Corporation. The transcript generator module 10 would then verify, using the public key provided in step 102, the existence of AUTH.DDL in step 116, that it was validly signed by the information technology department, and that it had been signed by X Corporation. Only if all of these checks succeed would the transcript generator module 10 will pass control to the APC 14 for the authentication phase (see step 132).

If in step 118 the APC 14 check is successful, the transcript generator module 10 proceeds to calculate a document checksum in step 120. The process of generating a checksum is a known mathematical process which takes the sequence of characters in a document and calculates a number which is mathematically related to the sequence. If the sequence of characters in a document is altered or changed, the checksum created with the revised document will not match the checksum created with the original version. By comparing a later calculated checksum to the original, the system of the present invention can monitor and determine whether a change has occurred in a document. For purposes of an exemplary embodiment, the present invention can use any checksumming software, such as those employing the RSA, Inc. MD5 algorithm or the Secure Hash Algorithm SHA-1. For additional information concerning checksumming methods, the reader is referred to U.S. Pat. No. 5,544,255 to Smithies et al. and U.S. Pat. No. 5,647,017 to Smithies et al, which are expressly incorporated by reference herein. If the client application passed a document, transaction or statement in step 102, the transcript generator module 10 in step 120 accesses the document, transaction or statement passed to it and executes a process, such as the MD5 Message Digest technique (published by RSA, Inc.) creating a one-way hash checksum of the characters within the document, transaction or statement.

After computing the document checksum in step 120, the transcript generator module 10 proceeds to step 122 where the transcript generator module 10 determines whether the client application 12 has set a flag to initiate a document review a document, transaction or statement as part of the affirmation process. The client application 12 would likely set the document review where the document, transaction or statement was contained in a previously generated file, such as one containing a contract, a bill of sale, a permit or application, a tax return or an affidavit. If the client application 12 is displaying the document at the time the transcript generator module 10 was invoked, the client application 12 might not need to set this flag. The flag would not be set in the case of an event. If the flag is set in step 122, however, the transcript generator module 10 invokes a document review procedure in step 124. This is a controlled process requiring the affirming party to complete a set of manual steps that creates evidence that the party enjoyed a fair opportunity to review and understand the document, transaction or statement and the terms and statements contained within it For example, the document review procedure requires in the exemplary embodiment one or more of the following:

1. The affirming party must electronically initial or sign or otherwise affirm each "page" or provision of an electronic document, transaction or statement, while the transcript generator module 10 records all relevant data, including time periods taken by the party for reviewing (by scrolling, etc.) and all errors on the part of the party (if any) in inputting his or her initials or other electronic signature.
2. The affirming party must re-type highlighted document terms into the computer system, while the transcript generator module 10 records all relevant data, including time periods taken by the party for typing, pauses between typing and all errors on the part of the party (if any) in inputting these terms.
3. The affirming party must scroll through all, or, optionally, a representative portion of, the portions or undertakings of the document, transaction or statement as they are presented in a narrow display window before being able to proceed with the affirmation process. The transcript generator module 10 records all relevant data, including time stamps of affirming party input events related to the document examination; this necessarily captures information on the periods taken by the party for viewing, and pauses between viewing inputs.

The list above is exemplary; there are many other algorithms or procedures which could be implemented to execute a document review. For example, in the case where a less rigid procedure for document review is appropriate, the affirming party would not be obligated in step 124 to review each and every provision or undertaking of the document, transaction or statement, but instead would be permitted to review freely any provision or portion of the document. In such an embodiment, the recording function 17 creates a record that can be used to show that portion of the document that was visible to the affirming party at the time of affirmation and all the images projected on the computer screen (or audio prompts selected).

Figure 4A:
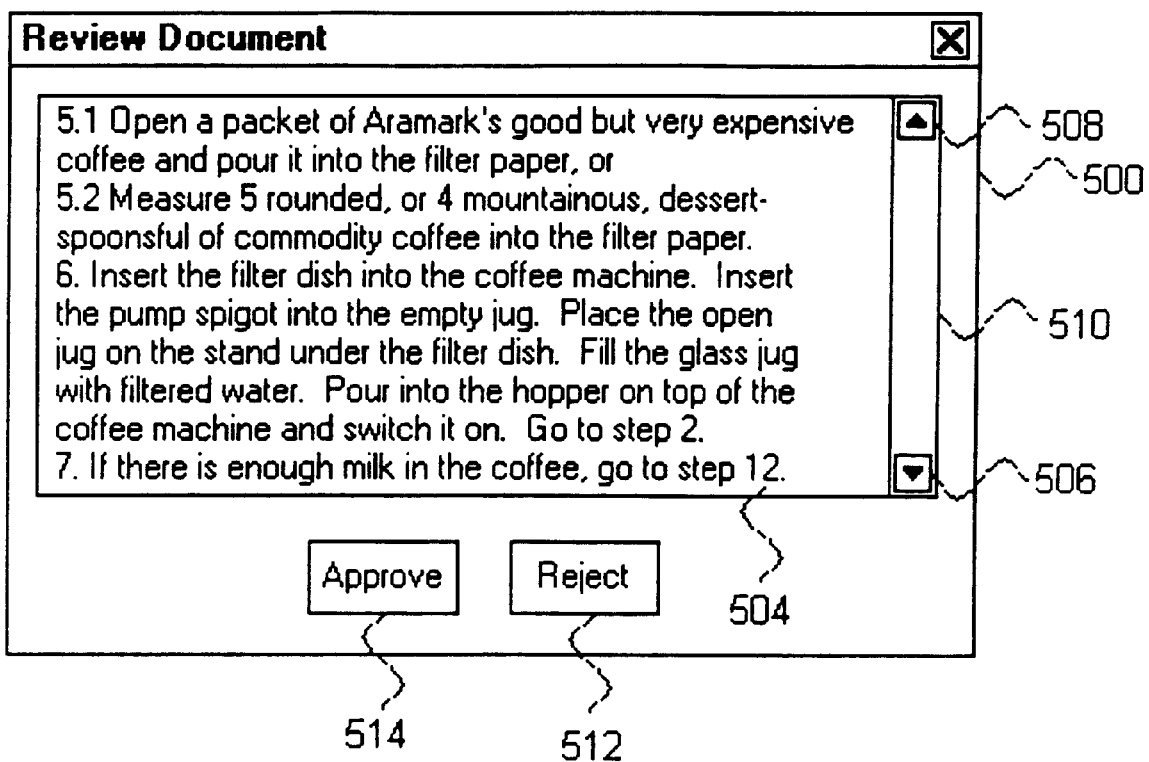
FIG. 4a depicts an exemplary window initiating the controlled procedure of document review.

However, in each case where a strict document review is required, the trnnscript generator module 10 presents a controlled procedure in which the affirming party must perform a number of physical tasks which create an evidentiary trail indicating he or she did review the portions or undertakings of a document, transaction or statement in their entirety. That review tends to establish that the party had a fair opportunity to read and understand its contents. FIG. 4a depicts an exemplary window which the transcript generator module 10 displays a portion of the document to the affirming party, initiating the controlled procedure of document review. The window in FIG. 4a depicts a text pane 500 for displaying the document, a scroll-bar 510 and scroll buttons 506 and 508 for altering the document view, an approve button 514 and a reject button 512. The affirming party uses the scroll bar 510 and the scroll buttons 506 and 508 to view different portions of the document. After viewing the document, the party either approves the document (or each of its terms, sequentially in a strict review) by clicking the approve button 514, or rejects the document (such as by rejecting one of the terms in a strict review) by clicking reject button 512.

To execute the above procedure, the transcript generator module 10 closely controls the document review process, such that for any affirmation process, no client application 12 (e.g., through an APC 14) can direct the way in which the document review procedure functions. While APCs 14 can alter some aspects of an affirmation ceremony (such as the signature capture and affirmation component), the document review process of step 124 is not one of those alterable processes. Thus, depending on the configuration of the transcript generator module 10 an the APC 14, the present invention allows different levels of control over the components of the affirmation process. For example, those components which must be closely controlled can be placed under the control of the transcript generator module 10 while those components which permit more flexibility can be assigned to a third party module, such as the APC 14. This "division of labor" permits the system to adapt to the different needs of the many different client applications 12. Also, with this configuration which supports a division of tasks, forgery of a transcript object becomes difficult as it would require a knowledge of all of the disparate systems (which likely would be under the control of different manufacturers).

Figure 3B:
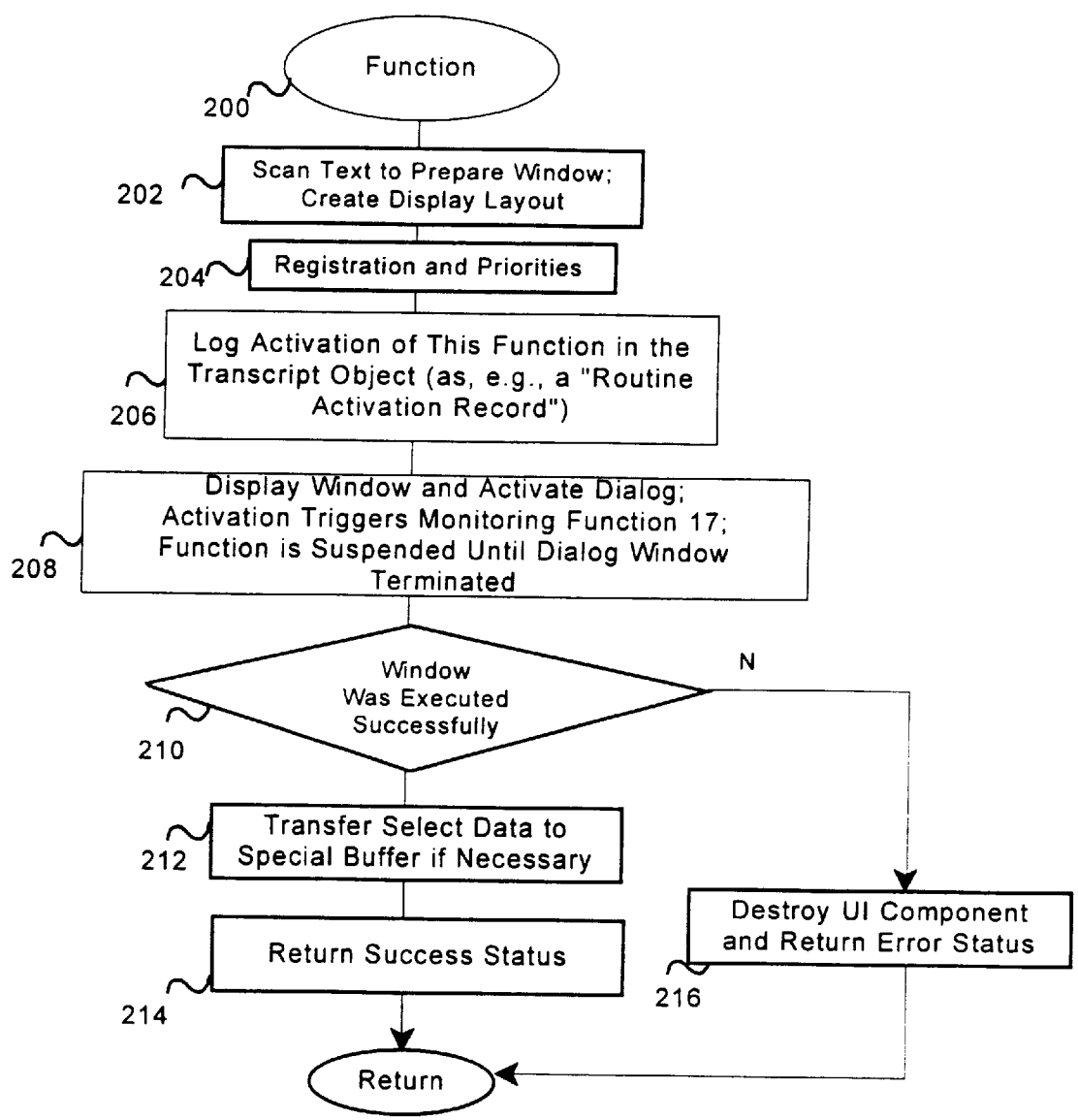
FIG. 3b depicts an exemplary process flow for one of the functions in the function library.

FIG. 3b depicts an exemplary process flow for one of the functions of step 124. In step 200 the function receives input from the transaction generator module 10 such as:

1. Indicator of data format (integer: 0=text, 1=bitmap)
2. Data length (integer)
3. Data buffer containing document display information (byte array)

In step 202, the function called by the transcript generator module 10 in step 124 uses window generation tools provided by the operating system (e.g., those provided by the Windows™ 95 operating system) to construct viewing window 500 and the related text pane 504, a scroll-bar 510, scroll buttons 506 and 508, an approve button 514 and reject button 512. Such a construction process could proceed as follows: Create text or bitmap pane as appropriate, one half of screen width and one half of screen height with scroll bars and insert the text or bitmap. In the case of text, the font must be black on white using the standard system font, increased as necessary to 10 point. Create floating dialog window to contain the text pane, location center screen just below the title bar. At the top, insert the text pane constructed in the previous step.

Below the text pane, locate two centered buttons, the left hand bearing the text "Approve" and the right hand bearing the text "Reject."

In step 204, the function sets system parameters for the window. For example, the function sets the window to be system-modal (i.e., to monopolize the event dispatching system). The function in step 204 also registers a high-detail event monitor (which performs the function of collecting transcript data using the recording function 17), as the event handler for the window and its controls.

By this step 204, the function sets up an event monitor that "traps" those affirming party inputs that will be considered as actionable events. In the exemplar embodiment, the recording function 17 registers the following events: mouse click, mouse double-click, and key stroke. In step 204, the function also registers all command buttons and the dialog close controls as dialog terminations. These events will trigger recording duties and terminations.

In step 206, the function proceeds to log the initialization of the display, the parameter data passed from the transcript generator function 10 and the system time and date (e.g., in 4-byte seconds since 00:00 1/1/70 GMT), in the transcript object 20 as a Dialog Start Record with a Dialog ID, e.g ("Document Review Dialog"). See Transcript Object 20 construction below. After this construction process the function proceeds in step 208 to display the window and activate the affirming party dialog by inserting the window in the fill screen window owned by the transcript generator module 10 and the subtask (invoked in step 108 above).

With this step the processing of the recording function 17 of the event monitor is also initiated. The recording function 17 is activated by the operating system on receipt of interactive events which concern that window. The recording function 17 records the sequence of the affirming party's inputs, (e.g., the sequence of scroll movements) into the transcript object. The affirming party uses the scroll bar 510 and the scroll buttons 506 and 508 for viewing different portions of the document. After viewing the document, the party will either approve of the document by clicking approve button 514 or reject the document by clicking reject button 512. The recording function 17 of the event monitor collects the affirming party's input, until the affirming party terminates the activity such as by clicking on the reject button 512.

Upon resumption of the function described in FIG. 3b, that function in step 210 checks a status flag passed by the operating system from the recording function 17 of the event monitor to ascertain whether there was satisfactory completion of the document review such as by checking to determine if the affirming party selected the approval button 514. If the affirming party's action was unsuccessful, the function will terminate, proceeding in step 216 to destroy the user interface components and returning an error status to the transaction generator module 10. If the affirming party's review was successful, the function in 210 will in step 212 write any data to be returned to the calling function into a buffer (in this case no data is returned) and proceed in step 214 to return a successful status to the transaction generation module 10.

The above process flow for the function in step 124 is exemplary. Functions within the function library 15, which also display windows to the affirming party, will also function according to the outlined process in FIG. 3b. Each function will have different specific parameters as the specific details of their display windows and data collected will differ. The recording function 17 is used by each of the functions within the function library 15 that collects input data from the affirming party. It operates as an operating system subroutine, such that when a library function outputs or writes a window to be displayed, the recording function's 17 processing will be activated by the operating system each time an input event occurs relating to that window or one of its subsidiary components.

Figure 3C:
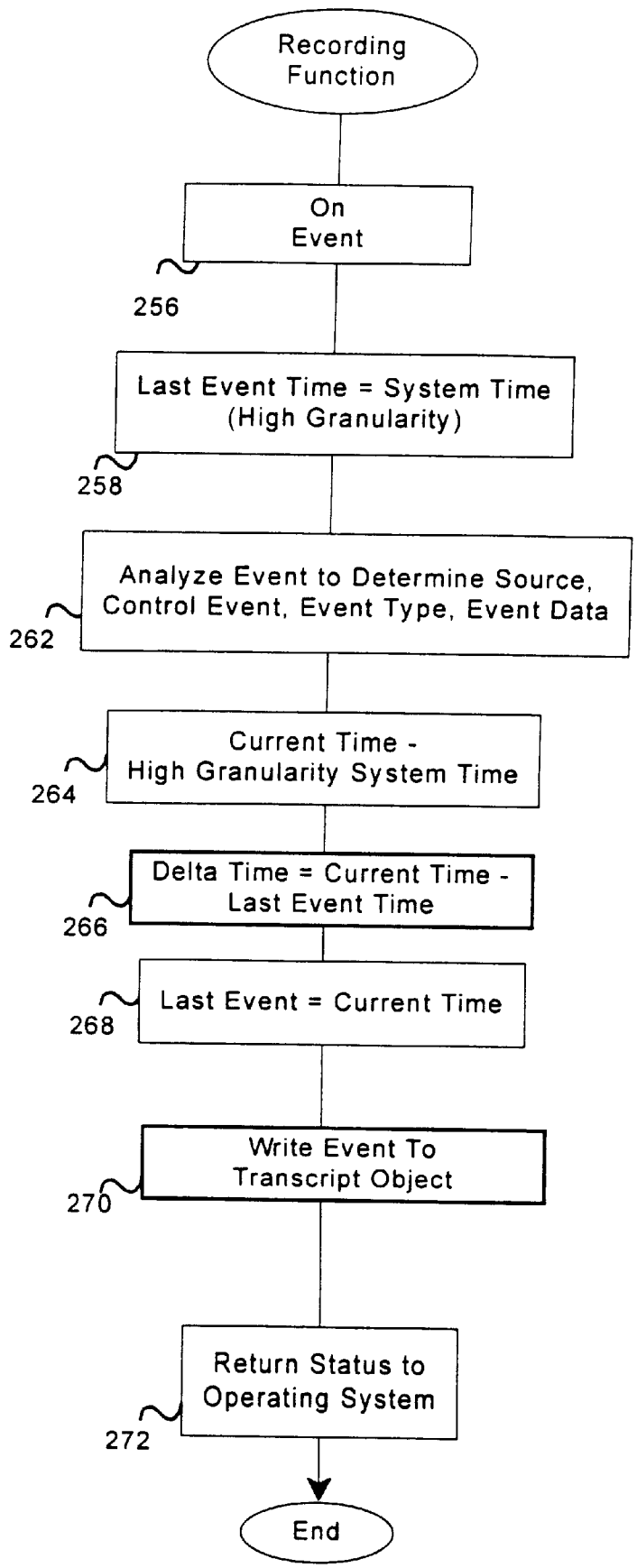
FIG. 3c depicts an exemplary process flow for the recording function which collects data and generates a record of the affirming party's activities when engaged in responding to the window prompt.

FIG. 3c depicts an exemplary process flow for the recording function 17 of the event monitor. When operating in the Windows™ environment, the recording function 17 receives all system events but "traps" and handles just those events for which it is registered. As stated above, such events might include mouse clicks and keystrokes. In step 256, the recording function 17 will activate upon receipt of an event from the operating system. Upon the occurrence of an event, the recording function 17 proceeds to step 258, where it obtains the time (e.g., a high-granularity time) from the operating system and stores it locally as the "Last Event Time."

In step 262, the recording function 17 analyzes the event data to determine source control, event type and event data. In step 264, the recording function 17 time stamps the event by obtaining the time (e.g., a high-granularity system time) from the operating system and storing that time temporarily as the current event time. In step 266, the recording function 17 further processes the captured time by calculating the difference between the current event time and the last event time (determined in step 258) (counting to milliseconds, if necessary) to complete a "Time Delta" value for the transcript object time data field. In step 268, the recording function 17 sets the last event time to equal the current time.

In step 270, the recording function 17 writes the event data to the transcript object 20, logging such data as source control, event type, event data and Time Delta In step 272, the recording function 17 returns a status indicator to the operating system. On the recording function's 17 receipt of a termination event, e.g., a mouse click on a control button or a window close button, the recording function 17 in step 270 writes a dialog close event to the transcript object 20 and returns a termination code to the operating system. In the normal course of events, this event will cause the function that created the window, e.g., the function which displayed the window in step 208, to reactivate.

Figure 3D:
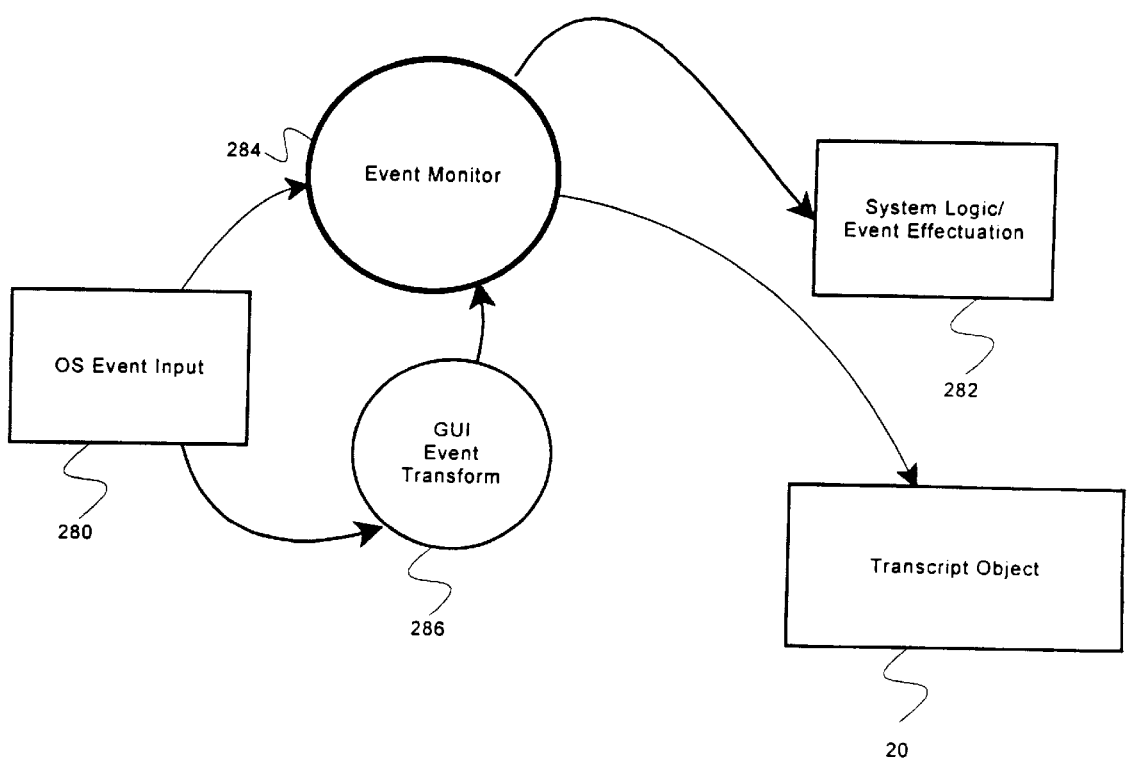
FIG. 3d depicts an exemplary data flow showing the interactions between the recording function of the present invention and the operating system components.

FIG. 3d depicts an exemplary data flow showing the interactions between an event monitor 284 (which employs the recording function 17 process) and the operating system components. The operating system, through input system 280, sends low-level event notifications (e.g., mouse click) direct to the event monitor 284 and also in parallel to handlers automatically registered with the subcomponents of the main dialog window (e.g. scroll bar 510, see FIG. 4a of the dialog window 500). These subsidiary component handlers interpret the low level events as higher level action events e.g. "Page Down," and pass them to their enclosing window (e.g. dialog window 500), whereupon they are received as high-level events by the event monitor 284. This indirect receipt of high level events is a result of movement of low level data from the input system 280 to its flow through the "GUI event transform" process 286, carried out by the handlers of the subcomponents to the event monitor 284. The recording function 17 of event monitor 284 in this process records the details of the event in the transcript object 20. In this manner, evidence of the affirming party's interaction with the viewing window (e.g. which portions of the document the affirming party requested to see) will be recorded. Finally, the event monitor 284 passes a status to the operating system in order for the results of the interaction to be processed by the appropriate on screen components (e.g. activation of a scroll bar resulting in a "Page Down" event would cause the text pane to scroll down; and activation of a command button such as "Cancel" would cause the dialog function to close down and destroy the dialog window 500 with its subcomponents, effectively de-registering the event monitor 284. This passage of control information to the operating system is represented in FIG. 3d by the link between the event monitor 284 and operating system event effectuation 282.

The following serves as an example of the information stored in the transcript object 20 by the recording function 17:

| Component | Event Type | Detail | Time |
| --- | --- | --- | --- |
| Text Pane | Key | Page Down | 10:41:30:02 |
| Text Pane | Key | Page Down | 10:41:31:10 |
| Text Pane Scroll bar | Mouse Click | Page Down | 10:41:35:43 |
| OK Button | Mouse Click | N/A | 10:41:40:09 |

The recording function 17 is used by all functions of the function library 15 that create and presents a window to the affirming party. Thus, in addition to the use of the function which utilizes the recording function 17 in step 124 of FIG. 3, the transcript generator module 10 and/or the APCs 14 also utilize the recording function 17 during the course of steps 132 and 128 (as described below).

Referring again to the transcript generator module 10 process illustrated in FIG. 3, the module executes the document review process in step 124, displaying to the affirming party the window set forth in FIG. 4a. If the document review function returns an error in step 126, the transcript processing module 10 proceeds in step 150 to terminate the affirmation process. However, if the document review process in step 124 is successful, the transcript generator module 10 proceeds in step 128 to verify affirmation details. This step involves several subcomponents which may be performed in any order, and in alternative embodiments, some of the steps could be omitted. In each case, the information is displayed visually or audibly to the affirming party in such a way that he or she may be presumed to notice any anomaly and refuse to affirm the document, transaction or statement in such circumstances. In the exemplary embodiment, the transcript generator module 10 using a function analogous to the capture bulk text function (from the fumction library 15) (not in the function library 15) displays the following three components for verification:

1. Verification that the affirming party is the correct person to affirm the document, transaction or event. This process requires the display of the name or other identifier of the party.

2. Verification that the time stamp to be generated by the system is correct. This process requires displaying the correct date and local time (e.g., in minutes) and may also require the correct display of the local time zone.

3. Verification that the declaration of intention does conform to and adequately express the affirming party's intention and present the party with the opportunity to edit or reselect the declaration of intention (if permitted by the client application 12).

FIG. 4b depicts an exemplary window that the transcript generator module 10 presents to the affirming party in step 130 for input of the verifying details described above. Window 518 displays several boxes containing information for the affirming party to verify. Box 520 displays the claimed identity of the affirming party and box 522 displays date, time and time zone. If the client application 12 has set the flag which permits the affirming party to choose or edit the declaration of intention, box 524 will display a selection of declarations of intentions and box 526 will show the current declaration of intention selected (or to be edited) by the affirming party. If a flag approving this has been passed from the client application 12, the affirming party may use the mouse to select a declaration of intention from box 524; this will then appear in box 526 otherwise, box 524 will not appear and box 526 will be enlarged accordingly. If the proper flag has been passed from the client application, the affirming party may edit the declaration of intention in box 526. When the affirming party is satisfied that the information displayed in window 518 is correct, he or she will click on button 530 to approve. If the information is incorrect, such that the affirming party does not wish to affirm the transaction, he or she will click button 528. Using the recording function 17 of the event monitor 284 described above with reference to FIGS. 3b and 3d, the transcript generator module 10 will present the window of 4b to the affirming party and record all relevant data, including the time periods taken by the party for reviewing verifying details, and all changes or corrections made to the verification details.

After the transcript generator module 10 executes the process of step 128, it proceeds in step 130 to check the results of the validation proceeding. If the function called in step 128 returns a negative indicator, the transcript generator module 10 proceeds from step 130 to terminate the affirmation process in step 150. However, if the function called in step 128, returns a positive result, the transcript generator module 10 proceeds from step 130 to capture the affirming party's affirmation using the designated APC 14 in step 132. In step 132, the transcript generator module 10 (through the processing of an APC 14) guides the affirming party through the methods for inputting the available types of electronic signatures. Available options are as many as permitted by the computer system, and may include digitized handwritten signatures, voice recordings (such as recitals of passwords or pass-phrases or the recitals of a signature declaration), and other signature (cryptographic, infometric, biometric, etc.).

In step 132, the transcript generator module 10 attempts to call the APC 14 that was specified by the client application 12. As stated above, in the exemplary embodiment, the APC 14 is responsible for the authentication of the affirming party, including any verification prescribed. To conduct the authentication the APC 14 uses the data provided by the client application 12 to tailor the authentication according to that which would be permitted by the creator of the APC 14 and the client application 12, given the hardware and software available on the system.

Figure 3E:
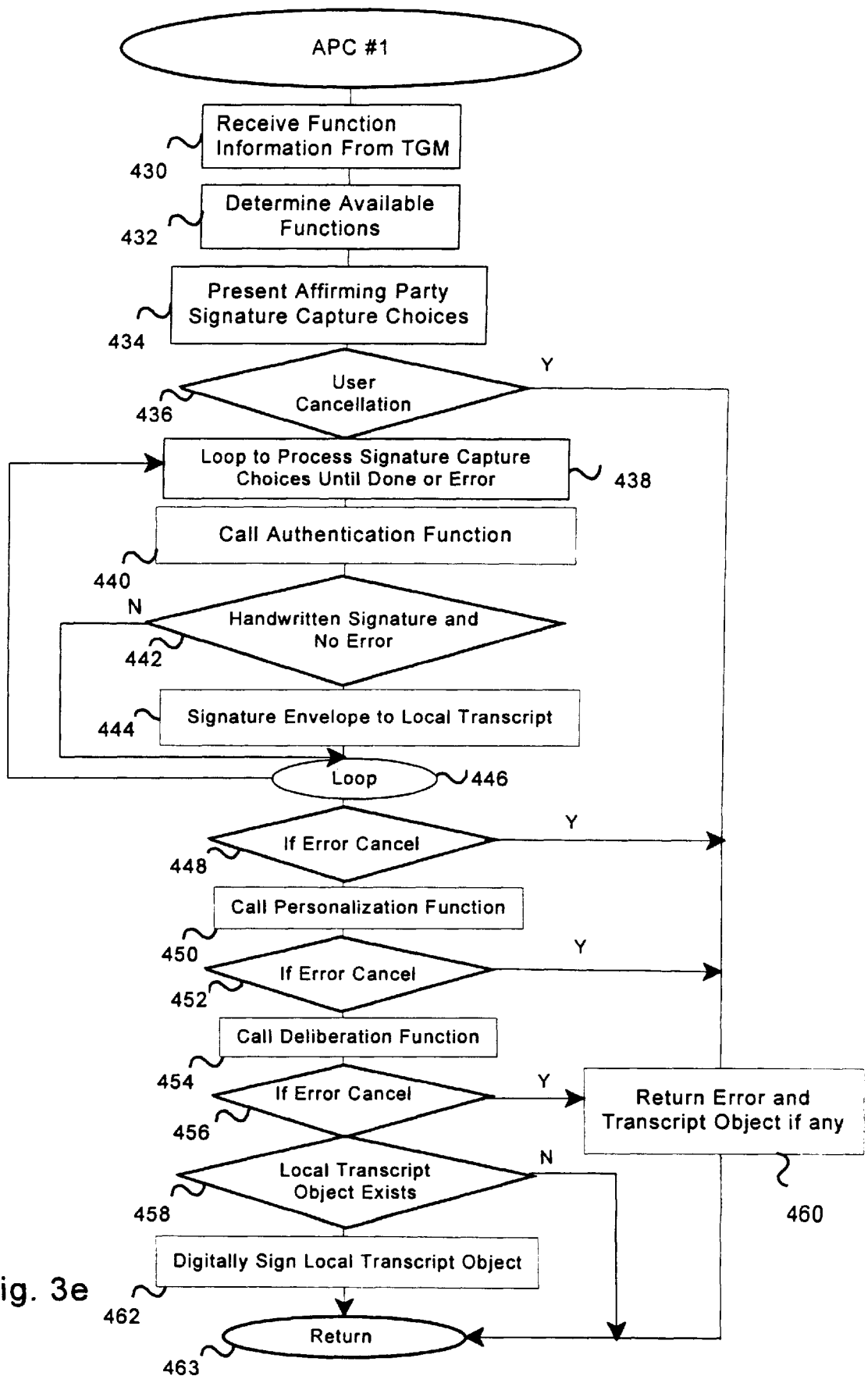
FIG. 3e depicts one exemplary process flow for an authentication policy component (APC) of the present invention.

The APC 14 of FIG. 3e (APC #1) permits an affirming party to choose one or more signature methods, such as: i) the input of a digital signature using a smart card; and/or ii) the input of a digitized handwritten signature. In step 430, the APC 14 receives parameters from the transcript generator module 10. The APC 14 receives two categories of information. First, the transcript generator module 10 passes all the data that the client application 12 had passed to it. This data will be referenced by a pointer or handle to a memory location. Second, the transcript generator module 10 passes a block of information describing the authentication mechanisms available from the function library 15. This block will contain a header and a series of descriptors, one for each authentication method listed. Each header will contain for example:

1. a version number ("1" in the exemplary embodiment) of the function indicating the version and compatibility level of the transcript generator module 10.

2. The total size in bytes of the header

3. The number of authentication method descriptors to follow

4. The size in bytes of each descriptor

The descriptors contain detail on each of the authentication methods available. There are as many descriptors as specified in the third field of the header. Each descriptor contains:

1. The vendor identification, e.g., a four byte integer

2. The authentication type, e.g., a two byte integer code.

An exemplary system of the present invention could employ authentication type codes such as:

| Code | Method |
|---|---|
| 1 | Reserved field, unused |
| 2 | Handwritten signature |
| 3 | Password identification |
| 4 | Asymmetric-key cryptographic signature capability |
| 5 | Voice identification |
| 6 | Iris or retina scan identification |
| 7 | Hand geometry scan identification |
| 8 | Fingerprint identification |
| 9 | Facial geometry identification |

3. Indication of whether or not data capture of the specified method is available (one byte integer).

4. Indication of whether or not verification of the method is available (one byte integer)

5. Reserved space (a space, e.g., 8 bytes for flags or other information)

For example, on a system equipped with a keyboard (for entering password information) and a handwritten signature capture and verification system, the block might appear as follows:

| Header: | Version | 1 |
|---|---|---|
| | Size of header (bytes) | 8 |
| | Descriptor number | 2 |
| | Size of descriptors (bytes) | 16 |
| Descriptor 1: | Vendor ID | 57 (indicates PenOp, Inc.) |
| | Authentication type | 3 (indicates password identification) |
| | Capture | Y |
| | Verification | N |
| Descriptor 2: | Vendor ID | 57 (indicates PenOp, Inc.) |

-continued

| | |
|---|---|
| Authentication type | 2 (indicates signature identification) |
| Capture | Y |
| Verification | Y |

In step 432, the APC 14 scans the data block and builds a temporary array to list the available signature types.

Figure 4C:
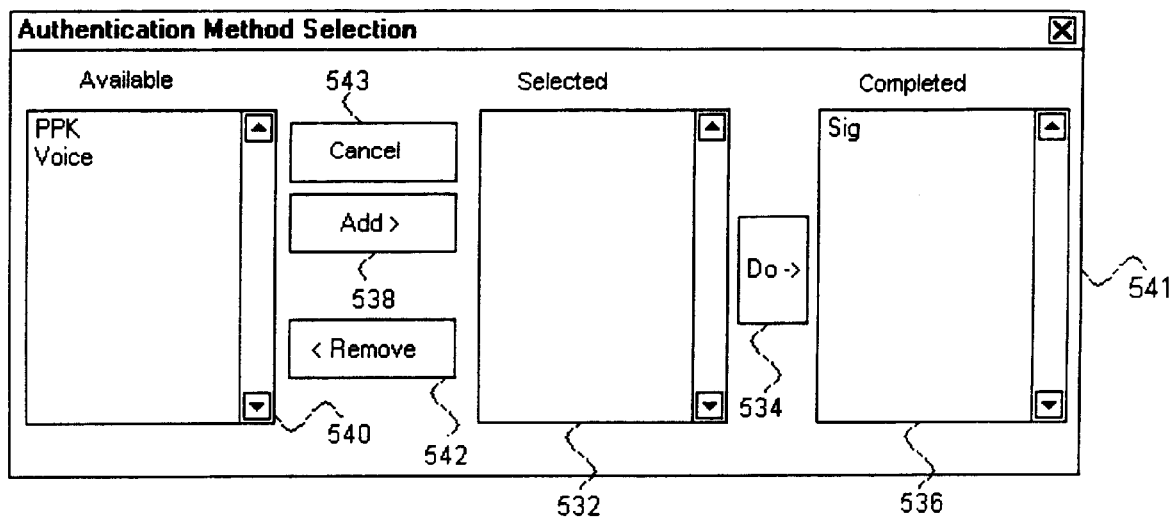
FIG. 4c depicts an exemplary window which enables the affirming party to select one or more formats for input of an electronic signature.
Figure 4D:
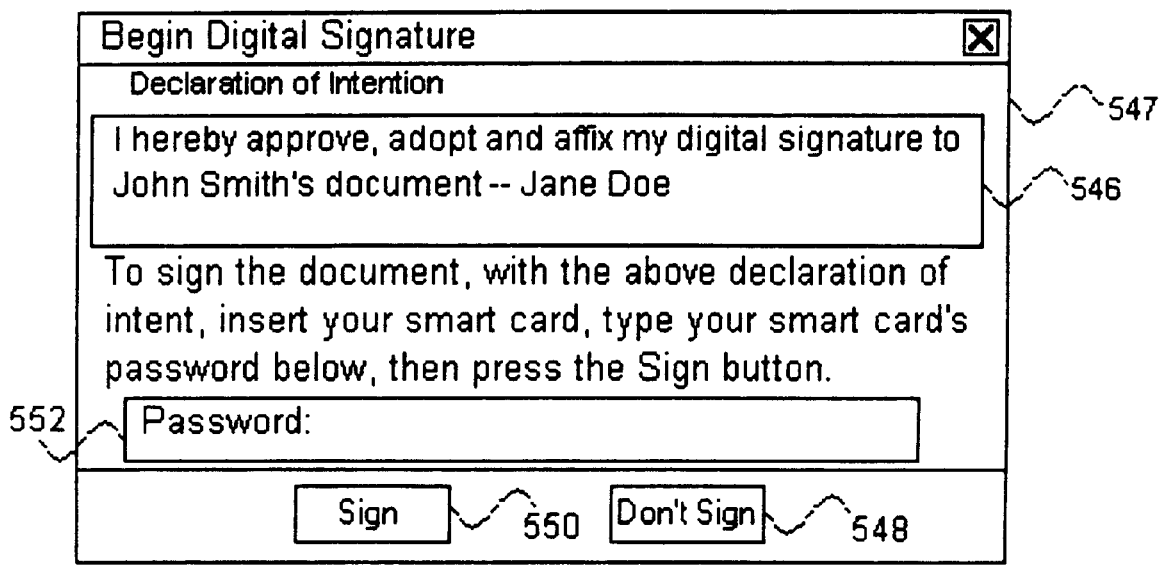
FIG. 4d depicts an exemplary window that displays the declaration of intention and permits the affirming party to input an electronic signature.

After determining the available authentication formats in step 432, the APC 14 next proceeds to step 434, where it will present the electronic signature options to the user with a flnction call to the Multiple Choice Alert function (one of the functions in the function library 15) described above. Using the steps presented above with reference to FIG. 3b, the Multiple Choice Alert function outputs a window such as window 541 illustrated in FIG. 4c. In FIG. 4c, box 542 lists the available authentication methods. The affirming party highlights the method in box 540 and clicks an "Add" button 538 to have a method appear in a "Selected" box 532. "Remove" button 542 may be selected to remove a method from the "Selected List" in box 532. When the affirming party has selected a list of at least one method displayed in box 532, the affirming party can begin the authentication process. If the affirming party clicks "Do" button 534 without having highlighted any listings in box 532, the APC 14 will activate all the methods listed in box 540. Alternatively, the affirming party may highlight one method in box 532 and that method alone will be executed when "Do" button 534 is clicked. As the affirming party successfully completes each authentication method, the method will be moved from the selected box 532 to the completed box 436. Only after all the authentication methods which were entered into box 532 have been moved to completed box 536 will the authentication process be complete. At any time during the selection process the arming party may cancel the affirmation process by clicking on the cancel affirmation button 543.

Referring again to the process described in FIG. 3e, the APC 14 will in step 436 evaluate the results from the selection procedure. If in step 436 the APC 14 determines that it received a negative result from the function call in step 434, the APC 14 proceeds in 460 to terminate the process and return control to the transcript generator module 10. If the function call in step 434 was successful, the APC 14 proceeds from step 436 to begin a loop in step 438 which executes the selected affirmation options. In this loop each of the available electronic signature options available within the function library 15 would be represented with function calls for their execution. For purposes of the exemplary embodiment, it is assumed that the affirming party has selected signatures both by smart card and handwritten signature, and the APC 14 will execute the loop steps 438–446 to perform these signature capture methods.

In step 440, the APC 14 obtains an identification for the first signature capture method and calls the function to execute that capture. In the present example, the first signature type is a digital signature capture, where the private asymmetric key for making the signature is stored in a smart card. Thus, in step 440 the APC 14 calls the function Capture Password with Declaration of Intention ("Capture Password Function") contained within the function library 15 to obtain a digital signature from a private key in a smart card. To make this call, the APC 14 passes parameters such as window title (string), declaration text, prompt (text) maximum password length (integer) and password buffer (string), as mentioned above. The Capture Password Function creates a window displaying the declaration of intention, which requests that the party affirm the document by entering his or her Smart Card (in the Smart Card reading device attached as a peripheral to the computer) and typing in a password at the keyboard. The Capture Password Function creates this window following the steps outlined with reference to FIG. 3b. The function outputs or writes a window, such as window 547 depicted in FIG. 4d. Window 547 also contains box 546 showing the declaration of intention previously confirmed by the affirming party in step 128. Window 547 requests that the affirming party input the smart card as form of acceptance to the provisions of the document transaction or statement. Box 552 provides an input for his or her password or PIN number. Once the affirming party has completed these actions, he or she will click a "Sign" button 550. If the affirming party refuses to sign, he or she has the option to click on a "Don't Sign" button 548, an act which will terminate the affirmation process.

With the display of window 547, the Capture Password Function invokes the recording function 17 to collect the affirming party's input following the steps outlined with reference to FIGS. 3c and 3d. The affirming party either complies with the request or rejects it. The recording function 17, after collecting the input and writing it to the transcript object 20, passes a result (success or failure) to the Capture Password Function. The Capture Password Function in turn passes the result to the APC 14.

After the signing process of step 440, the loop of the APC 14 process proceeds in steps 442–444 to check for special case concerns related to biometric signatures, such as the digitized handwritten signature as described below. However, if the smart card signing process described above was successful, the APC 14 proceeds in step 446 to loop and return to step 438 for another type of signature update.

In the example presented, the second type of signature capture is the capture of a digitized handwritten signature. In step 440, the APC 14 calls a signature authentication function, but in this instance, the APC 14 calls the function "Capture Digitized Signature with Declaration of Intention" from the function library 15 ("Capture Signature Function"). As stated above, the system and method of the present invention permits signature capture to be executed through third party signature capture systems 16 (See FIG. 1). In the presented examples, the Capture Signature Function (called in step 440) allows for such third party signature capture by making a call to a subsystem such as the signature capture system described in U.S. Pat. No. 5,544,255 and U.S. Pat. No. 5,647,017 which are expressly herein incorporated by reference. The signature capture system described in these patents is embodied to capture signatures such as a digitized handwritten signature and store them within a signature envelope. In step 442, the Capture Signature Function accepts such a signature envelope and will pass that envelope along with the success or failure of the operation to the APC 14. Upon receipt of the result from the Capture Signature Function, the APC 14 stores the signature envelope in a local transcript. In step 442, the APC 14 determines if the signature capture process was one that would return a signature envelope and, if so, the APC 14 in step 444 stores that envelope in the local transcript. In step 446, the APC loops and returns to step 438 to execute more selected signatures methods unless either it has obtained a negative result or there are no more signature types to process.

Assuming the result is positive and there are no more signature methods to process, the APC 14 proceeds in step 448 to execute further processing. In step 448, the APC 14 determines if the last signature capture function returned with an unsuccessfull result. If so, the APC 14 proceeds to step 460 to return an error and processing terminates. If the signature capture functions have executed successfully, the APC 14 can proceed to execute personalization process and/or a deliberation process.

In step 450, the APC 14 executes a personalization function that confirms and "personalizes" the electronic signature by implementing one or more of the following processes:

1. The APC 14 requests additional unique personal information, such as a mother's maiden name, the birthplace of the affirming party, a secret code, or a private key constituting a cryptographic link to the affirming party.
2. The APC 14 requests confirmation of the act of affirmation by a witness and will present to that witness the same series of personal information queries as set forth in paragraph 1 above.
3. The APC 14 offers an opportunity for the affirming party to input unique evidence such as a typed text, e.g. via the capture bulk text library function in the function library 15 or audio recording arbitrarily selected by the party. Such an opportunity allows the party to mark the document in a way that serves as a special remembrance of the act of affirmation and, importantly, records evidence that can assist a third party in ascertaining the identity of the affirming party. This option will be especially desirable when one party present at an affirmation event wishes to preclude an allegation that he or she deceitfully signed or affirmed for another party, such as in the case of a lawyer wishing to forestall an allegation that without authority she used her clients infometric key, which was in her possession, to sign or affirm a contract prepared for the client.

If the client application 12 has presented a document transaction or statement to be affirmed, step 450 might optionally be repeated one or more times to confirm the affirming party's personal review of specific items within the document, transaction or statement. For example, the APC 14 might display a selected item from the document, such as a disclaimer of warranty, and present a text or aural instruction such as, "Please signify your specific approval of this disclaimer by typing "yes" and the name of your favorite color." In this context, the typing of "yes" and the name of a color in connection with a specific item from an electronic document would be analogous to handwriting one's initials next to the item if it were printed on paper.

Figure 4E:
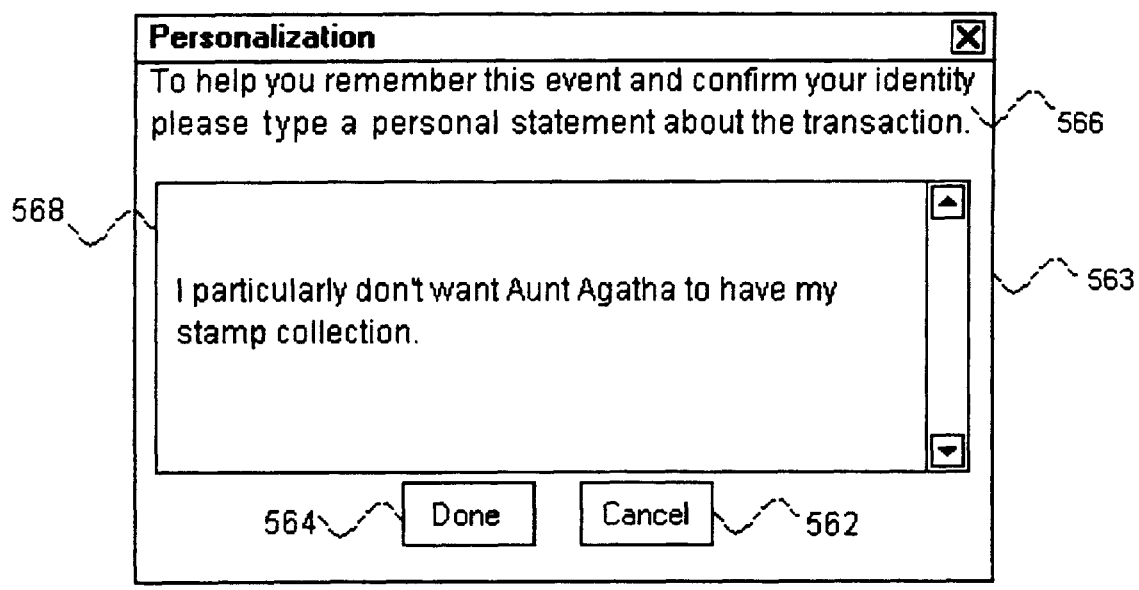
FIG. 4e depicts an exemplary window which prompts the affirming party to input additional "personalization" information.

To execute this personalization function, the APC 14 in step 450 calls the "Capture Bulk Text" function from function library 15 to allow the affirming party to enter unique, personal information to memorialize the transaction. The "Capture Bulk Text" function will be passed information specifying a personalization window. Using the steps outlined with respect to FIG. 3b, the Capture Bulk Text flnction outputs or writes a window to the screen, such as window 563 which is illustrated in FIG. 4e. Window 563 contains a box 568 into which the affirming party may enter a number of sentences in response to a given statement, such as statement 566, which asks the affirming party to enter information to confrrm his or her identity and serve as a remembrance. The affirming party can change and review the text until he or she clicks upon either a "Done" button 564 or "Cancel" button 562.

The "Capture Bulk Text" function activates the recording flnction 17 of the event monitor 284, as described with respect to FIGS. 3c and 3d, to create personalization entry details stored in the transcript object 20. If in step 452 of FIG. 3e, the APC 14 determines that the function called in step 450 returned an error code, the APC 14 will signal an error in step 460 and return to the transcript generator module 10.

Figure 4F:
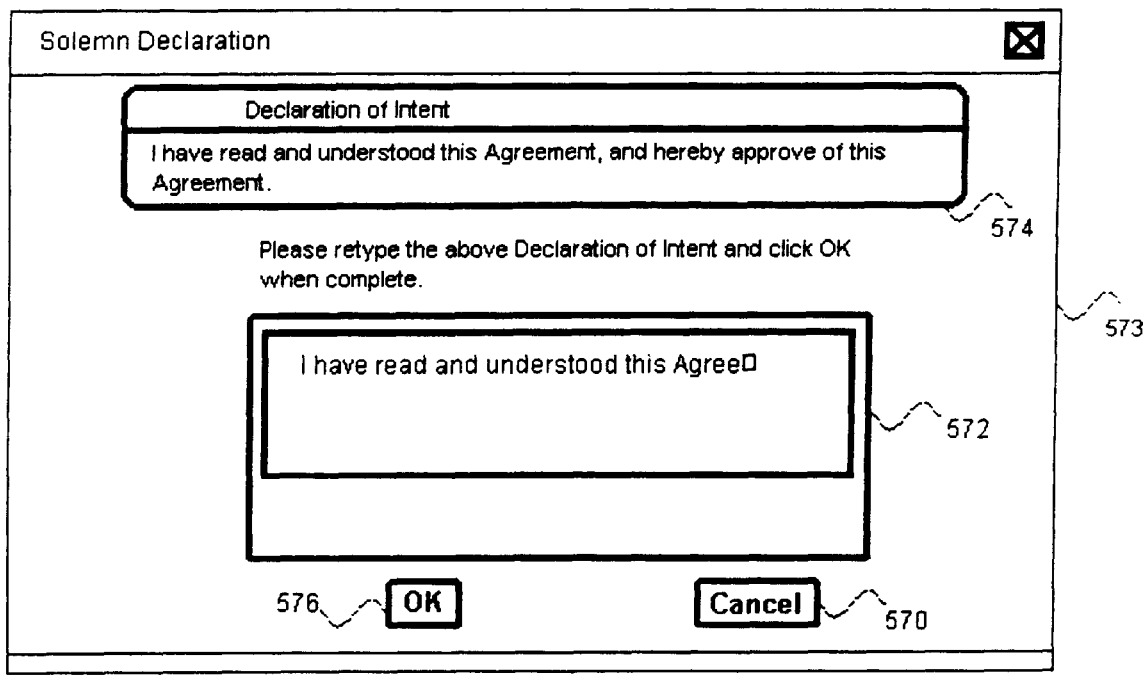
FIG. 4f depicts an exemplary window in which the affirming party is prompted to retype the declaration of intention to confirm to his or her understanding and intent after deliberation.
Figure 4G:
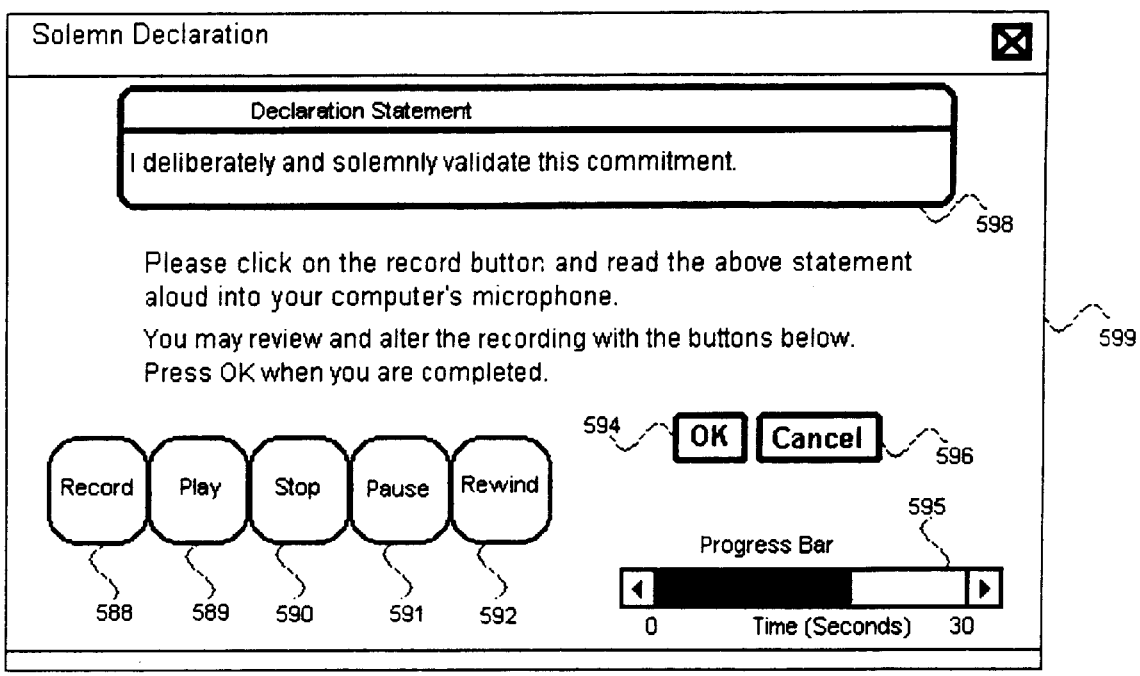
FIG. 4g depicts an exemplary window in which the affirming party is prompted to input an audio recording to confirm his or her understanding and intent after deliberation.

If no error is detected in step 452, the APC 14 proceeds to step 454 where it executes a "deliberation" process—a process to affirm the document, transaction or event and to signify the affirming party's deliberation of it. In this step 454 (which can be made optional in alternative embodiments), the APC 14, using a function from the function library 15, presents the affirming party with a visual (or audio) inquiry as to whether the party is sure that he or she has had adequate opportunity to deliberate and he or she understands that the affirmation will result in legal accountability. For example the inquiry might read, "Do you attest under penalty of perjury that you are Jane Doe, that this is your tax return for the year 1998 and that statements contained herein are correct?" FIGS. 4f and 4g depict exemplary windows in which the affirming party is prompted to confirm his or her understanding and intent after deliberation. FIG. 4f presents a window 573 which is presented to the affirming party and requests that the affirming party retype a statement using the keyboard. The declaration of intention appears in box 574; the command in window 573 asks the affirming party to retype if he or she remains in agreement with the declaration of intention. Box 572 permits the affirming party a space into which he or she can retype the statement. Once the affirming party retypes the statement and clicks on an "OK" button 576, the window 573 will close and control will return to the APC 14. If the affirming party chooses not to retype the statement, he or she may terminate the affirmation procedure by clicking on a "Cancel" button 570.

It is to be noted that FIG. 4g depicts an alternative window display for the deliberation process in step 454. FIG. 4g depicts window 599, which is configured to accept a solemn declaration by means of an audio response. Window 599 contains a box 598 with a declaration statement, "I deliberately and solemnly validate this commitment." The window 599 further requests that the affirming party read the above statement and record it using the computer. To record, the window 599 presents a record button 588, a rewind button 592, a play button 589, a pause button 591 and a stop button 590. In addition, a progress bar 595 shows the time that is available for the affirming party recording (e.g., 30 seconds). The affirming party makes the recording and then clicks an "OK" button 594 to accept it or a "Cancel" button 596 to cancel the activity.

The deliberation function requires the user to read and re-enter (e.g., through keyboard entry or by voice recording) the declaration of intention. The deliberation function, as with the other functions above, will invoke the recording function 17 to have the deliberation details stored in the transcript object 20. The deliberation function will return a code signifying the affirming party's response, either affirmative or negative. If the affirming party has entered a negative response to the deliberative procedure in step 454, the APC 14 upon receiving the response in step 456 will proceed to terminate the operation in step 460. If in step 456 the response is successful, the APC proceeds to step 458.

In step 458, the APC prepares to return to the transcript generator module 10 after a successful affirmation process. In step 458, the APC checks to determine if one of the signatures captured was one with a signature object (such as the signature envelope prepared by the third party signature capture system described above). If so, the APC 14 proceeds in step 462 to imprint its own digital signature upon the signature object and then return it to the transcript generator module 10. If there is no signature object, the APC 14 returns control to the transcript generator module 10 in step 463.

It is to be noted that the above described APC 14 is exemplary and that there are many different combinations of steps which could make up the APC 14 component of the present invention. For example, in the case of a handwritten signature, the confirmed declaration of intention may be presented to the affirming party when the APC 14 is ready to accept the signature. In this case, the entry of the handwritten signature may be accomplished in the context of a computer display which makes it clear, by its close analogy to the paper signature, that entry and acceptance of a signature will be evidence of the affirming party's acceptance of the document, transaction or event. In the case of a voice recording, such as a password or pass-phrase, it may be appropriate for the affirming party to utter a password or pass-phrase previously or subsequently enrolled into a computer speech verification system.

In other cases of voice recording, the APC 14 may ask the affirming party to read aloud and thereupon record the declaration of intention or another signature declaration (e.g., "I, Jane Doe, hereby sign my 1998 federal tax return."). Where a physical token (such as a smart card, debit card, credit card or other access card), cryptographic key, typed password or physiological/biometric data is used, the affirming party will be prompted to interact with the appropriate peripheral device or module so that the signature data may be invoked, used, read, recorded or confirmed as appropriate by the computer system. For example, if the signature is a so called "digital signature" created with the aid of a secret or private cryptographic key possessed by the affirming party, then the APC 14 calls an appropriate cryptographic module or resource to cause with the aid of that key, the encryption of a checksum or hash of the document. In the exemplary embodiment, the APC 14 informs the party (using the declaration of intention) that the submission of any of the above electronic signatures will be taken to denote approval of and assent to the provisions or undertakings of the document, transaction or event.

Figure 3F:
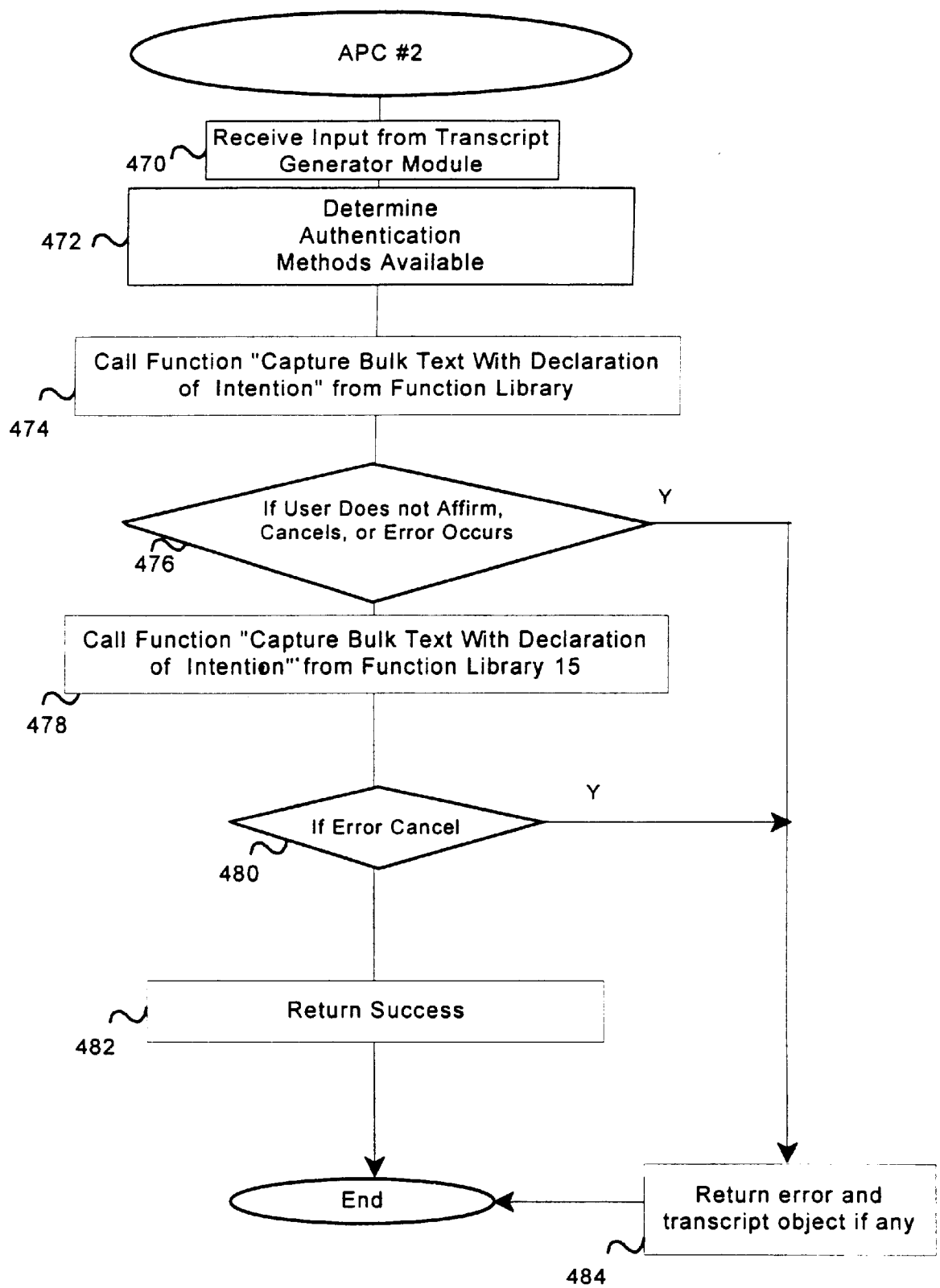
FIG. 3f depicts a second exemplary process flow for an APC of the present invention.

FIG. 3f depicts an exemplary process flow of a second APC 14 (APC #2), which permits the affirming party to affirm a document by only two steps: i) approving of (and entering and editing) a declaration of intention; and ii) entering a personal statement unique to the time of the affirmation ceremony. The APC 14 described in FIG. 3f does not permit the user any choice or options in terms of signature methods. In comparison to the signature ceremony presented by the APC in FIG. 3e, the ceremony set forth in FIG. 3f is more compact. In addition, the APC 14 described in FIG. 3c uses a solemn declaration window for the purposes of signature capture, thus showing that many different signature types can be used to construct a reliable affirmation transcript.

In step 470, the APC 14 receives a set of parameters from the transcript generator module 10. As stated above, the information includes a set of function headers (indicating the set of signature capture methods that are available and a set of descriptors for each method). In step 472, the APC 14 determines whether the methods to be used by this APC 14 are available on this computer system.

In step 474, the APC 14 calls one of these functions—the function Capture Bulk Text with Declaration of Intention ("Capture Text Function") contained within the function library 15. The APC 14 passes the Capture Text Function parameters such as window title (string), multiple declarations (text) and prompts (text). The Capture Text Function creates a window displaying declaration of intention, and requests that the affirming party affirm the declaration of intention by pressing the "Affirm" button. The window output or written to the screen is a window similar to that illustrated in FIG. 4f and described above. The Capture Text Function activates the recording function 17 of the event monitor 284 to collect the party's input while affirming (and choosing or editing) the declaration of intention. The party may type the text and press the "Affirm" button or the party may cancel the transaction by pressing the "Don't Affirm" button. Upon the affirming party's input of an accept or cancel, the recording function 17 records the affirming party's input and passes the result (success or failure) to the Capture Text Function. The Capture Text Function passes the results back to the APC 14.

In step 476, the APC 14 evaluates the result of the function call in step 474. If the result is negative (i.e., the affirming party has canceled the transaction), the APC 14 proceeds in step 484 to return the appropriate error code to the transcript generator module 10. If the result from step 476 is success (i.e., the affirming party has not canceled the transaction but has approved of the deliberation process), the APC 14 continues to step 478 where the APC 14 will capture a personalization statement entered by the affirming party. In step 478, the APC 14 calls the Capture Text Function from the function library 15, passing the function the parameters such as: window title (string) and prompt (text). The affirming party will be asked to enter a brief statement, via, e.g. the keyboard or an attached microphone, which memorializes the events surrounding the affirmation of the document. As above, the Capture Text function creates a window such as the window described with respect to FIGS. 4e and 4f. The capture text function records, by actuating the recording function 17 of the event monitor 284 the details of entering of the personalization statement (if it takes place) in the transcript, and returns either a success code or an error code to the APC 14. In step 480, if the affirming party cancels the transaction after the personalization process, the APC 14 returns an error indicator to the transcript generator module 10 in step 484. If the result in step 480 was a success, the APC 14 in step 482 returns a success code to the transcript generator module 10.

Referring again to FIG. 3, control returns to the transcript generator module 10 in step 136 after the APC 14 completes its function. In step 136 the transcript generator module 10 checks the results of the APC 14 procedure. If the APC 14 returns a negative result, the transcript generator module 10 proceeds to terminate the affirmation procedure in step 150. If the APC 14 returns after successful execution the transcript generator module 10 executes a verification for any data returned by the APC 14. As stated above, the APC 14, when executing certain signature capture methods can collect data (such as a signature envelope) which it must return to the transcript generator module 10. In such instances, the transcript generator module 10 executes a check on the data before adding it to the transcript object 20. The transcript generator module will, again using the public key provided by the client application 12, verify the key used by the APC 14. If the check is successful, the transcript generator module 10 adds the transcript passed from the APC 14 to the transcript object 20 together with the public key of the authorizing agent that created the APC 14.

In step 142, the transcript generator module 10 also gathers corroborative evidence from the computer system itself as to the facts and circumstances of the affirmation. In addition to the time and date of affirming information, collected and confirmed in step 130, the transcript generator module 10 also collects computer operating system information (such as a serial number or name and version number), computer serial numbers (for the terminal used by the affirming party) and computer program application information (such as the name and version of the client application, its file location or its serial number, or information on other applications installed on the system).

The transcript generator module 10 provides for further proof of its integrity in step 144 by calculating an integrity checksum. As stated above, the checksum provides protection to ensure that the transcript object 20 will not be altered after it has been created. In this process, the transcript generator module 10 calculates a checksum using the contents of the transcript object 20. The checksum is calculated using the integrity checksum key provided by the client application 12. Without knowledge of the key provided by the client application 12, it is difficult, if not impossible, to modify the transcript object 20 and regenerate a satisfactory checksum. By providing the correct key when performing an integrity check, a client application 12 or other authorized application can confirm (provided the key was not disclosed) that the transcript object 20 was not decrypted, modified and re-encrypted.

In step 146, the transcript generator module 10 then encrypts the transcript object 20 to create a secure and tamper-resistant record of the affirmation process for the document, transaction or event. In the exemplary embodiment, the transcript generator module 10 uses common methods of text encryption. In step 134, the transcript generator module 10 returns the transcript object 20 to the transcript generator module 10 for storage and further processing.

CONSTRUCTION OF THE TRANSCRIPT OBJECT

The transcript object of the exemplary embodiment of the present invention consists of a header followed by a sequence of one or more records. The final record is always a terminator record. Certain standard data types are detailed in a data dictionary.

In the exemplary embodiment, there are three fundamental transcript object data types:

Integer: Least significant byte stored first. Length implicit. Unsigned. Signed Integer: Least significant byte stored first. Length implicit. Boolean: 1-byte integer, values 0=false, non-0=true.

In the exemplary embodiment, the transcript object will contain the following derived data types:

Time stamp: number of seconds since 00:00 1/1/1970. 4-byte integer. Delta Time: number of milliseconds. 65535= 65.5 seconds or longer. 2-byte integer. Record Type: 1-byte integer. Values:

00: Terminator
01: Keystroke
02: Mouse click
03: Mouse double click
04: Dialog Termination
05: Signature data or biometric sample
06: Hash data
07: APC transcript addendum
08: Declaration of intention
09: Affirming Party's Claimed ID
10: Application public key
11: APC public key
12: APC identifier
13: Document identifier
14: Time Zone
15: Dialog Start
16: Interaction prompt
17: Dialog input text
18: Activated UI Control Data
19: Button Text Array Data
20: Verification Data
21: APC defined Data
722: Keystroke Statistics Vendor ID: Arbitrary integer identifying the originator of a software user authentication product. 4-byte integer. Values:

57: PenOp

Dialog ID: Integer identifying a user interaction initiated by the transcript generator module or by an APC via a transcript generator library function. Values:

00: Unused, reserved
01: Claimed ID/Date/Time/Thomasina/Declaration of Intention Dialog
02: Document Review Dialog
03: Password returning hash Dialog
04: Password with Declaration of Intention, returning hash Dialog
05: Password, returning password Dialog
06: Password with Declaration of Intention, returning password Dialog
07: Text string capture Dialog
08: Text string capture with Declaration of Intention Dialog
09: Capture bulk text Dialog
10: Capture bulk text with Declaration of Intention Dialog
11: Multiple choice alert Dialog
12: Signature alert with Declaration of Intention Dialog Authentication Type ID: A 2-byte integer indicating the type of authentication or biometric evidence. Values:

0: Unused, reserved
1: Handwritten signature
2: Password
3: Asymmetric cryptographic signature capability (implementation not defined)
4: Voice
5: Iris or retinal scan
6: Hand geometry
7: Fingerprint
8: Facial geometry
9: Typewritten Hash Type: a 1-byte integer indicating the type of hash data. Values:

0: Unused, reserved
1: RSA Inc. MD5
2: SHA-1

Hash Field ID: a 2-byte integer indicating the nature of the data hashed. Values:

0: Unused, reserved
1: Document data
2: Claimed ID

3: Declaration of Intention

4: Transcript

64+: Transcript Record (ID+64)

Variable Data: a two-part variable length data item in two parts:

Length: 2-byte integer

Byte array: length given by the Length field above.

The header of the transcript will now be described. In the exemplary embodiment, it contains the following fields:

Version Number: (Value: 1) (2-byte integer)

Record type: all records in the transcript object begin with a record type. The fields which follow vary depending on the record type. All fields are contiguous. These are the record types, with the fields which may follow each:

---

Terminator Record
Time stamp
Operating System Identifier: 4-byte integer
Boot volume ID: 4-byte integer
Hardware serial number: 4-byte integer
Operating System Version: 4-byte integer
Transcript hash: 16-byte RSA Inc MD5 of entire transcript, excluding solely this field
Keystroke Record
    Key value: 1 byte
    Input UI control ID: 2-byte integer
    Delta Time
Mouse click
    Input UI control ID: 2-byte integer
    Delta Time
Dialog Termination
    Delta Time
Signature Data or Biometric Sample
    Authentication Type ID
Vendor ID: Variable Data
Hash Data
    Hash type
    Count of fields hashed: 2-byte integer
    Array of Hash Field IDs
    Hash data: 16 bytes for RSA Inc MD5, 20 bytes for SHA-1
APC Transcript Addendum
    Addendum: Variable Data
    APC Signature: Variable Data (APC's digital signature of data field)
Declaration of Intention
    Variable Data
User's Claimed ID
    Variable Data
Application's Public Key
    Variable Data
APC's Public Key
    Variable Data
APC Identifier
    Variable Data
Document Identifier
    Variable Data
Time Zone
    Minutes before GMT: 2-byte signed integer (e.g. EST = 3500)
Dialog Start
    Dialog ID
    Declaration of Intention displayed: Boolean
    Window Title: Variable Data
    Time stamp
Interaction Prompt
    Variable Data
Dialog Input Text
    Variable Data
Activated UI Control Data
    Control ID: 4-byte integer
    Keystroke Equivalent: 2-byte integer (0 for no equivalent)
    Delta Time
Button Text Array Data
    No. of buttons: 1-byte integer
    Array of Variable Data
Verification Data
    Signature Type ID
    Vendor ID
    Score: 1-byte integer (0 = no match; 100 = very good match)
    Time stamp
APC Defined Data
    Variable Data
Keystroke Statistics
    Delete count: 2-byte integer
    Keystrokes per minute: 2-byte integer
    Time stamp

---

Further Use of the Transcript Object 20 (Transcript Viewing Tools and Signature Verification)

The client application 12, and any other application which may have access, cannot alter or change any item of data within the transcript object 20. However, in the exemplary embodiment, those applications may store it, retrieve it and perform associated functions upon it, which include encoding the transcript object 20 into a data block for archiving or for transmission to a remote system; retrieving the data block from memory and reconstructing the encrypted transcript object 20 in a form identical to the object originally created by the transcript generator module 10; viewing certain information within the transcript object 20 (using the set of provided transcript viewing tools 22); and verifying certain types of signatures contained within the transcript object 20 using the signature verification system 24.

The data block for storage contains the same information as the original transcript object 20 but expressed in a highly structured form such that the transcript object 20 can be reconstituted at a later date from the same block of data. An application with access to the transcript object 20 can execute the viewing and verification functions when the object is reconstituted.

FIG. 5 depicts an exemplary set of functions which comprise the transcript viewing functions 22. This set of functions can be invoked by the client application 12 or any other application which would have access to the transcript object 20. As the present invention provides a secure, tamper-resistant system and method for processing and handling the transcript object 20, it is noted that the applications, such as the client application 12, are provided only a limited and controlled access to information within the transcript object 20 through specific command driven functions such as the following:

| | | |
|---|---|---|
| 1. | claimed_id (702) | Displays the claimed identity of the affirming party. |
| 2. | time_signed (704) | Displays the date/time of the affirmation process. |
| 3. | verify_file (706) | Where the client application 12 had presented a document, transaction or statement to the transcript generator module 10, this function checks the contents of the document, transaction or statement against the stored document checksum. |
| 4. | integ_chk (708) | Checks the contents of the transcript object 20 against the stored integrity checksum which is accessible upon receipt of an client application 12 key. |
| 5. | sig_typ (710) | Displays the types of electronic signature(s) used to verify the document, transaction or event. |
| 6. | dec_i (712) | Displays the declaration of intention either provided by the client application 12 or prepared by the party as part of the transcript generator module 10 process. |

-continued

| 7. dump_file (713) | Outputs to the named file an ASCH dump of all data contained within the transcript, suitable for subsequent forensic analysis. |
|---|---|

In addition, the present invention provides that the client application 12 and other applications that have access to the transcript object 20 can use the signature verification system 24 to verify those electronic signatures which are based on biometric data (e.g., digitized handwritten signatures, retinal scans, voice recordings and fingerprints, or cryptographic data). For handwritten signatures, the systems described in U.S. Pat. No. 5,544,255 to Smithies et al. and U.S. Pat. No. 5,647,017 to Smithies et al. describe systems for the verification of handwritten signatures against previously stored templates. Such systems are expressly incorporated by reference herein and are useable as the signature verification system 24 of the present invention.

CONTROLS FOR MULTIPLE AFFIRMING PARTIES

In an alternative embodiment of the present invention, more than one affirming party may affirm a transaction in succession. In such an embodiment of the present invention, the selected APC 14 warns a subsequent affirming party if a document has changed between the time of an earlier affirmation and the time the subsequent affirming party invokes the module. In that event, the system optionally precludes the subsequent party from affirming. In the case of multiple affirmations, the respective transcript objects 20 show such detail as the order of signing or affirming, the time elapsed between each signing or affirmation and whether the transaction changed between signings or affirmations.

ADDITIONAL APPLICATIONS

In addition to the description above, the present invention can be further embodied in alternative configurations tailored to specific applications. It is noted that the teachings of the present invention can be applied to a wide variety of applications where the affirmation of a document, transaction or event is necessary and for obtaining a good record of the identity and intent of the affirming party. As such, the system and method described above can be applied to applications such as systems for the execution of contracts and agreements, systems for the filing of applications for insurance policies and governmental licenses, systems for the filing of statements and governmental compliance papers such as tax returns, systems for the purchase or sale of goods or services across a networked computer system, such as the Internet and company-area networks. In particular, and to further show the wide range of uses the present invention can have, additional descriptions of systems incorporating the teachings of the present inventions are presented below for application in: 1) a networked system for electronic commerce (such as over the Internet); 2) a system for transcribing sworn testimony; and 3) a system for the administering of an examination, such as a timed, adversarial examination.

i. Affirming Network Executed Documents, Transactions or Events

In this embodiment the transcript generator module 10 is resident upon and operated on a World Wide Web server and the client application 12 for the affirming party is an electronic commerce program which operates for a client on the Web site of the server. A person accessing the Web using a browser such as the Netscape Navigator™ can access this electronic commerce program by accessing the client's Web site. Because the party is located at a location remote from the server, the present invention provides an additional configuration to permit the affirmation of the contemplated electronic transaction.

Rather than interacting directly with the affirming party, the transcript generator module 10 will download a compact interface program, such as a Java-based applet to the affirming party's browser. The interface program then assists with the transcript generator module 10 to present displays and prompts to the affirming party and to report his or her interaction with the browser during the affirmation process. In such a scenario, the Web server transmits an HTML (Hypertext Mark-up Language) form, together with the interface program to the affirming party's browser. The affirming party then completes the form (e.g., an order form for goods having a value of $50) and that information (plus the recorded date of the affirming party's signing or other affirmation) to the Web server. In the initial call to the transcript generator module 10, the Web server presents, inter alia, the following data:

1. The claimed ID of the affirming party;
2. A digest of the contents of the form in plain text form;
3. A bitmap image of the form;
4. A declaration of intention stating that the affirming party assents to terms or statements contained in the presented HTML Form; and
5. Data Related to the APC 14.

The transcript generator module 10 then invokes the interface program (e.g the Java applet) to display a digest of the contents of the transaction (to the affirming party) in a small window and to transmit all of the affirming party's interactions with the window until it is dismissed; these interactions are stored in the transcript object 20. Further, the transcript generator module 10 will also invoke the interface program to transmit the date, time and time zone of the affirming party's local computer system. Upon the receipt of that information, the transcript generator module 10 will again invoke the interface program (Java applet) to display the affirming party's claimed ID, the date and time, and the declaration of intention in a composite window, which invites the affirming party to either accept or reject that data. The transcript generator module 10 also invokes the interface program to request personalization data from the affirming party, such as a spontaneously typed or vocalized statement that would help the affirming party recall the circumstances of the ceremony in the future. Again, the interface program transmits all the affirming party's interactions until the window is dismissed.

If the affirming party accepts the contents of the previous window, the transcript generator module 10 then checks the APC 14, and if this process is successful, passes control to the APC 14. The APC 14 invokes the transcript generator module 10 to input a confirmatory password or PIN (personal identification number) from the affirming party. The transcript generator module 10 in turn invokes the interface program (the Java applet) to present to the affirming party a window which asks him or her to accept the password or PIN. The program will further monitor and log all of the affirming party's interactions until the password is dismissed. The transcript generator module 10 will them return the password information to the APC 14. The APC 14 then verifies the password or PIN (such as against an entry in a database) and determines whether there is a match. If there is a match, the APC 14 builds a brief transcript indicating that a password was input and successfully verified. The APC 14 then "signs" this transcript (e.g., with a private, asymmetric key to create a digital signature) and returns control to the transcript generator module 10. The transcript generator module 10 checks the signature on the transcript of the APC 14 and, if the check succeeds, adds that transcript to the transcript object 20. To complete the procedure, the transcript generator module 10 signs and encrypts the entire transcript object 20 before returning it to the Web server.

ii. Affirming Witness Testimony

The system and method of the present invention can also be applied to a witness' affirmation of his or her testimony, taken, for example, in deposition or in court. In such an embodiment the affirmation of the witness would not be associated with an electronic signature in the traditional sense. Rather, the "signature" or token of the witness would be his or her undertaking of an oath. In an exemplary embodiment, the oath could be recorded, for instance with a digital video camera and a microphone. The computer system would provide a biometric measuring algorithm (configured for the processing of audio and video input) to process the input and obtain a set of biometric measurements of the witness—his or her speech pattern, eye movements and other body movements, behaviors or features—as the witness raises his or her hand and repeats a phrase such as "I swear that the testimony I give is the truth, the whole truth and nothing but the truth." The transcript generator module 10 would receive the evidence to store in the transcript object 20. The APC 14 in this embodiment is designed to record each step of the event, including the declaration of intention, the delivery of the oath "token," the entry of personalization data and the completion of the deliberation process (see FIG. 3 step 132). The transcript generator module 10 links the transcript object 20 to a file containing the content of the testimony. In such an embodiment, the oath can be taken both before the testimony begins, and then confirmed after testimony is provided with a window to signify acceptance of the statements after knowledge and deliberation. In this step, the transcript generator module 10 will also provide the witness with the opportunity to first review the statements in the testimony before prompting the witness to re-affirm its contents as containing the truth.

It is to be noted that in utilizing the system and method of the present invention (in an embodiment such as a system for affirming witness testimony), it is possible to control the affirmation process so that, if desired, a part of the affirmation process can occur before the transaction or event occurs (e.g., the witness can make an initial oath or affirmation before his or her testimony is recorded) and then the remainder of the controlled affirmation process can occur after the transaction or event is complete (e.g., the witness can, after being deposed, review the statements he or she made and then affirm their correctness by entering personalization data and completing the deliberation affirmation).

iii. Administering and Monitoring Exams

The system of the present invention may be used to ensure that examinations are carried out properly, and on the proper subject. For instance, the system may be used to validate a sobriety or breath alcohol test commonly used on motorists suspected of driving while intoxicated. The system assists in ensuring that the target of the sobriety test is the party actually taking the test and that the party is acting knowledgeably and voluntarily. Before the sobriety test is administered, the transcript generator module 10 is invoked and records the events surrounding the validation of the identity of the subject (through, for instance, the capture of a biometric token). The module also presents a declaration of intention to ensure the subject was given the opportunity to know the reason for the test and the legal ramifications of it; the subject's examination of and response to the declaration of intention are recorded and saved in the transcript object 20.

The test would then be administered as usual, under the control of a computer system recording certain details of the examination, including video data and breath analysis data. At random times during the test, the transcript generator module 10 is programmed to interrupt the subject and require identity verification information to ensure that subject is still the party participating in the examination. At the completion of the examination, the transcript generator module 10 permits the subject to review the results of the test, and prompts the subject to reaffirm his or her voluntary and informed participation in the test and again verify his or her identity information.

The invention continues as described above. The described embodiments of the invention are meant to be representative only, as certain changes may be made from that described herein without departing from the clear teachings of the invention. Accordingly, reference should be made to the following claims which define the invention.

What is claimed is:

1. A computer system for creating a secure, tamper-resistant electronic transcript which memorializes the events of a user's affirmation, through the entry of a signature token, of an electronic transaction having terms, the system comprising:
   a. a transaction application module enabling an affirming party to create an electronic transaction;
   b. a transcript generator module; and
   c. a signature token verification module accepting the signature token from the affirming party, verifying the signature token and transmitting a verification signal to the transcript generator module;

wherein the transcript generator module accepts the terms, confirms the acceptance of the terms by presenting prompts, allows the affirming party to affirm the terms, gathers forensic data surrounding the affirming party's affirmation and stores information related to the prompts, the forensic data and the verified token as separate data entities in a tamper-resistant transcript object.

2. The system of claim 1 where the transcript generator module:
   a. presents the terms of the document and prompts the affirming party to affirm the document;
   b. collects forensic data concerning the affirming party's affirmation;
   c. prompts the affirming party to input the signature token;
   d. links the tamper resistant file to the signature token and to the set of terms; and
   e. stores the forensic data and the signature token in the transcript object.

3. The system of claim 1, wherein the transcript generator module computes a checksum value of the transcript object and stores the checksum value in the transcript object.

4. The system of claim 1, wherein the transcript generator module encrypts the transcript object.

5. The system of claim 1, wherein the transcript generator module stores in the transcript object information describing the computer system.

6. The system of claim 1, wherein the transcript generator module stores in the transcript object data relating to the times of the entry of the forensic data.

7. The system of claim 1, wherein the signature token comprises a representation of the claimed identity of the affirming party.

8. The system of claim 1, wherein the signature token comprises a hand written signature.

9. The system of claim 1, wherein the signature token comprises voice print information.

10. The system of claim 1, wherein the signature token comprises eye pattern information.

11. The system of claim 1, wherein the signature token comprises fingerprint information.

12. The system of claim 1, wherein the signature token comprises a stamp.

13. The system of claim 1, wherein the signature token verification module:
    selects an at least one available identity input option from a plurality of possible identity input options; and
    requests the signature token based on the at least one available identity input option.

14. The system of claim 1, wherein the signature token comprises credit card information.

15. A computer based method for recording a series of acts constituting the signing of an electronic document and assuring an affirming party's intent, comprising the steps of:
    presenting the electronic document to the affirming party;
    allowing the affirming party to electronically examine the document;
    collecting examination data representing affirming party inputs during examination of the document;
    displaying an at least one prompt indicating the intention of the affirming party towards the document;
    allowing the affirming party to examine the at least one prompt;
    collecting prompt data representing affirming party inputs during the affirming party examination of the at least one prompt;
    requesting identity information from the affirming party;
    collecting identity input data representing affirming party inputs of identity information;
    creating a document checksum of the document;
    generating ceremony information comprising a record of the series of acts constituting the signing of the electronic document from:
        the presentation of the document to the affirming party;
        the examination data;
        the prompt data; and
        the identity input data;
    creating a transcript object; and
    storing the at least one prompt, identity information, document checksum and ceremony information in the transcript object.

16. The method of claim 15, further comprising the steps of computing a checksum value of the transcript object and storing the checksum value in the transcript object.

17. The method of claim 15, further comprising the step of encrypting the transcript object.

18. The method of claim 15, wherein the step of displaying the at least one prompt includes the steps of:
    allowing the affirming party to choose from a set of prompts; and
    collecting prompt choice data representing affirming party input relating the choice of prompts and;
wherein the step of generating ceremony information includes the step of generating information based the prompt choice data.

19. The method of claim 15, wherein the step of displaying the at least one prompt includes the steps of:
    allowing the affirming party to alter the at least one prompt; and
    collecting prompt alteration data representing affirming party input relating to the alteration of prompts; and
    the step of generating ceremony information includes the step of generating information based on the prompt alteration data.

20. The method of claim 15, wherein the step of displaying the at least one prompt includes the steps of:
    allowing the affirming party to input a user created prompt; and
    collecting prompt creation data representing user input relating to the creation of the prompt; and
the step of generating ceremony information includes the step of generating information based on the prompt creation data.

21. The method of claim 15, further comprising the step of storing in the transcript object information describing the computer system executing the method.

22. The method of claim 15, wherein the examination data, prompt data, and identity input data each have a corresponding at least one entry time, and the ceremony information includes data relating to the corresponding at least one entry times.

23. The method of claim 15, where the series of acts includes a plurality of affirming party inputs, each affirming party input having a corresponding time, and the ceremony information includes an at least one of the corresponding times.

24. The method of claim 15, wherein the step of presenting the document to the affirming party includes the step of presenting an at least one portion of the document to the affirming party, and wherein the ceremony information includes data relating to the at least one portion.

25. The method of claim 15, wherein the at least one portion of the document is presented to the affirming party for an at least one length of time corresponding to the at least one portion, and wherein the ceremony information includes data relating to the at least one length of time.

26. The method of claim 15, further comprising the step of evaluating the examination data and creating the transcript object if the examination data is sufficient.

27. The method of claim 15, wherein the identity information comprises a representation of the claimed identity of the affirming party.

28. The method of claim 15, wherein the identity information comprises a hand written signature.

29. The method of claim 15, wherein the identity information comprises voice print information.

30. The method of claim 15, wherein the identity information comprises eye pattern information.

31. The method of claim 15, wherein the identity information comprises fingerprint information.

32. The method of claim 15, wherein the identity information comprises a stamp.

33. The method of claim 15, wherein the step of requesting identity information from the affirming party includes the steps of:
    selecting an at least one available identity input option from a plurality of possible identity input options; and
    requesting identity information based on the at least one available identity input option.

34. The method of claim 15, wherein the identity information comprises credit card information.

35. A computer based method for recording a series of acts constituting the signing of an electronic document and assuring an affirming party's intent, comprising the steps of:

presenting an electronic document to be signed to the affirming party;

allowing the affirming party to electronically examine the document by performing the substeps of:

accepting an at least one document review user input command; and displaying an at least one portion of the document in accordance with the at least one document review user input command;

displaying a declaration of intention indicating the intention of the affirming party towards the document;

verifying the identity of the affirming party by performing the substeps of:

requesting identity information from the affirming party; and accepting identity information from the affirming party;

recording an at least one identity input event relating to the identity information;

creating a document checksum of the document;

generating ceremony information from:

the presentation of the document to the affirming party;

the at least one document review user input command and the at least one portion of the document displayed; and the at least one identity input event; and storing the identity information, document checksum and ceremony information in a transcript object.

36. The method of claim 35 further including the steps of:

allowing the affirming party to examine the declaration of intention by performing the substep of:

accepting an at least one declaration of intention review affirming party input command, wherein the step of displaying the declaration of intention is carried out in accordance with the at least one declaration of intention review affirming party input command;

generating further ceremony information from the at least one declaration of intention review affirming party input command and information relating to the display of the declaration of intention; and storing the further ceremony information and the declaration of intention in the transcript object.

37. The method of claim 36, further comprising the steps of computing a checksum value of the transcript object and storing the checksum value in the transcript object.

38. The method of claim 36, further comprising the step of encrypting the transcript object.

39. The method of claim 35, further comprising the steps of computing a checksum value of the transcript object and storing the checksum value in the transcript object.

40. The method of claim 35, further comprising the step of encrypting the transcript object.

41. The method of claim 35, wherein the step of displaying the declaration of intention includes the steps of:

allowing the affirming party to choose from a set of declarations of intent; and collecting declaration of intention choice data representing affirming party input relating the choice of declarations of intention; and wherein the step of generating ceremony information includes the step of generating information based the declaration of intention choice data.

42. The method of claim 35, wherein the step of displaying the declaration of intention includes the steps of:

allowing the affirming party to alter the declaration of intention; and collecting declaration of intention alteration data representing affirming party input relating to the alteration of the declaration of intention; and the step of generating ceremony information includes the step of generating information based on the declaration of intention alteration data.

43. The method of claim 35, wherein the step of displaying the declaration of intention includes the steps of:

allowing the affirming party to input an affirming party created declaration of intention; and collecting declaration of intention creation data representing affirming party input relating to the creation of the declaration of intention; and the step of generating ceremony information includes the step of generating information based on the declaration of intention creation data.

44. The method of claim 35, where the series of acts includes a plurality of affirming party inputs, each affirming party input having a corresponding time, and the ceremony information includes an at least one of the corresponding times.

45. The method of claim 35, further comprising the step of storing in the transcript object information describing the computer system executing the method.

46. The method of claim 35, wherein the at least one document review user input command and the at least one identity input event each have an at least one entry time, and the ceremony information includes data relating to the at least one entry times.

47. The method of claim 35, wherein the at least one declaration of intention review affirming party input command has an at least one entry time, and the ceremony information includes data relating to the at least one entry time.

48. The method of claim 35, further comprising the step of evaluating the examination data and creating the transcript object if the examination data is sufficient.

49. The method of claim 35 wherein the identity information comprises a representation of the claimed identity of the affirming party.

50. The method of claim 35 wherein the identity information comprises a hand written signature.

51. The method of claim 35 wherein the identity information comprises voice print information.

52. The method of claim 35 wherein the identity information comprises eye pattern information.

53. The method of claim 35 wherein the identity information comprises fingerprint information.

54. The method of claim 35 wherein the identity information comprises a stamp.

55. The method of claim 35, wherein the step of requesting identity information from the affirming party includes the steps of:

selecting an at least one available identity input option from a plurality of possible identity input options; and requesting identity information based on the at least one available identity input option.

56. The method of claim 35, further comprising the steps of:

accepting user personalization data; and storing the user personalization data in the transcript object.

57. The method of claim 35 wherein the identity information comprises credit card information.

58. A computer based system for recording a series of acts constituting the signing of an electronic document and assuring an affirming party's intent, comprising:

presentation means presenting an electronic document to be signed to the affirming party, the presentation means allowing the affirming party to electronically examine the document by accepting an at least one document review affirming party input command and displaying an at least one portion of the document in accordance with the at least one document review affirming party input command, the presentation means displaying a declaration of intention indicating the intention of the affirming party towards the document;

verification means verifying the identity of the affirming party by requesting identity information from the affirming party and accepting identity information from the affirming party;

checksumming means creating a document checksum of the document;

ceremony generating means generating ceremony information from:
the presentation of the document to the affirming party;
the at least one document review affirming party input command and the at least one portion of the document displayed; and
the at least one identity input event relating to the identity information; and storing the identity information, document checksum and ceremony information in a transcript object.

59. The system of claim 58 wherein:

the presentation means allows the affirming party to examine the declaration of intention by accepting an at least one declaration of intention review affirming party input command and the presentation means displays the declaration of intention in accordance with the at least one declaration of intention review affirming party input command; and the ceremony generation means generates further ceremony information from the at least one declaration of intention review affirming party input command and information relating to the display of the declaration of intention and stores the further ceremony information and the declaration of intention in the transcript object.

60. The system of claim 59, wherein the checksumming means computes a checksum value of the transcript object and stores the checksum value in the transcript object.

61. The system of claim 59, wherein the ceremony generating means encrypt the transcript object.

62. The system of claim 58, wherein the checksumming means computes a checksum value of the transcript object and stores the checksum value in the transcript object.

63. The system of claim 58, wherein the ceremony generating means encrypt the transcript object.

64. The system of claim 58, wherein the presentation means:

allows the affirming party to choose from a set of declarations of intent;

collects declaration of intention choice data representing affirming party input relating the choice of declarations of intent; and the ceremony generating means generates information based the declaration of intention choice data.

65. The system of claim 58, wherein presentation means: allows the affirming party to alter the declaration of intention; and collects declaration of intention alteration data representing affirming party input relating to the alteration of the declaration of intention; and the ceremony generating means generates information based on the declaration of intention alteration data.

66. The system of claim 58, wherein the presentation means:

allows the affirming party to input an affirming party created declaration of intention; and collects declaration of intention creation data representing affirming party input relating to the creation of the declaration of intention; and the ceremony generating means generates information based on the declaration of intention creation data.

67. The system of claim 58, where the series of acts includes a plurality of affirming party inputs, each affirming party input having a corresponding time, and the ceremony information includes an at least one of the corresponding times.

68. The system of claim 58, wherein the ceremony generating means stores in the transcript object information describing the computer system executing the system.

69. The system of claim 58, wherein the at least one document review affirming party input command and the at least one identity input event each have an at least one entry time, and the ceremony information includes data relating to the at least one entry times.

70. The system of claim 58, wherein the at least one declaration of intention review affirming party input command has an at least one entry time, and the ceremony information includes data relating to the at least one entry time.

71. The system of claim 58, wherein the ceremony generating means evaluates the examination data and creates the transcript object if the examination data is sufficient.

72. The system of claim 58 wherein the identity information comprises a representation of the claimed identity of the affirming party.

73. The system of claim 58 wherein the identity information comprises a hand written signature.

74. The system of claim 58 wherein the identity information comprises voice print information.

75. The system of claim 58 wherein the identity information comprises eye pattern information.

76. The system of claim 58 wherein the identity information comprises fingerprint information.

77. The system of claim 58 wherein the identity information comprises a stamp.

78. The system of claim 58, wherein the verification means:

selects an at least one available identity input option from a plurality of possible identity input options; and requests identity information based on the at least one available identity input option.

79. The system of claim 58 wherein the identity information comprises credit card information.

80. A computer-based system for creating a secure transcript of the events that occur when an affirming party affirms an electronic document or an electronic transaction, the system comprising:

a. a computer coupled to an interface and programmed to present information to the affirming party, capture data upon input, and process that data;

b. the computer further comprised to receive as input an electronic document which sets out terms of the transaction;

c. the computer further programmed to:
  i. present the terms of the transaction to the affirming party and prompt the affirming party to affirm the terms using a constraint that enables to computer to collect forensic data concerning the affirmation;
  ii. collect forensic data surrounding the affirming party's affirmation and encode the forensic data;
  iii. collect terms data concerning the terms of the agreement;
  iv. collect computer data concerning the computer;
  V. accept from the affirming party a signature token for the affirming party and encode that information for the token; and
  vii. store the forensic data, terms data, computer data and signature token as separate data entities in a tamper-resistant electronic data structure.

81. A computer based method for recording a series of acts constituting the signing of an electronic document, comprising the steps of:

presenting the electronic document to a signatory;

selecting an at least one available identity input option from a plurality of possible identity input options;

requesting identity information from the affirming party based on the at least one available identity input option;

collecting identity input data representing affirming party inputs of identity information;

creating a document checksum of the document;

creating a data object; and storing the identity input data and the document checksum in the data object.

82. A computer based system for recording a series of acts constituting the signing of an electronic document, comprising:

means for presenting the electronic document to a signatory;

means for selecting an at least one available identity input option from a plurality of possible identity input options;

means for requesting identity information from the affirming party based on the at least one available identity input option;

means for collecting identity input data representing affirming party inputs of identity information;

means for creating a document checksum of the document; and means for creating a data object and storing the identity input data and the document checksum in the data object.

* * * * *